United States Patent
Kandur Raja et al.

(10) Patent No.: US 9,933,854 B2
(45) Date of Patent: Apr. 3, 2018

(54) VIRTUAL INPUT DEVICE AND METHOD FOR RECEIVING USER INPUT USING THE SAME

(71) Applicant: Samsung Electronics Co., Ltd., Suwon-si, Gyeonggi-do (KR)

(72) Inventors: Barath Raj Kandur Raja, Suwon-si (KR); Wan Seok Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 14/995,664

(22) Filed: Jan. 14, 2016

(65) Prior Publication Data

US 2016/0209928 A1    Jul. 21, 2016

(30) Foreign Application Priority Data

Jan. 16, 2015 (KR) .......... 10-2015-0007917

(51) Int. Cl.

| | |
|---|---|
| *G06F 3/041* | (2006.01) |
| *G06F 3/01* | (2006.01) |
| *G06F 1/16* | (2006.01) |
| *G06F 3/042* | (2006.01) |
| *G06F 3/0488* | (2013.01) |
| *H04N 9/31* | (2006.01) |

(52) U.S. Cl.
CPC ............ *G06F 3/017* (2013.01); *G06F 1/1673* (2013.01); *G06F 3/0426* (2013.01); *G06F 3/04886* (2013.01); *H04N 9/3179* (2013.01)

(58) Field of Classification Search
CPC .. G09G 5/00; G09G 5/08; G06F 3/033; G06F 3/02; G06F 3/041; G06F 3/045; G06F 3/04; G06F 3/01
See application file for complete search history.

(56) References Cited

U.S. PATENT DOCUMENTS

| | | |
|---|---|---|
| 6,266,048 B1 | 7/2001 | Carau, Sr. |
| 6,614,422 B1 | 9/2003 | Rafii et al. |
| 6,724,370 B2 | 4/2004 | Dutta et al. |
| 8,228,315 B1 | 7/2012 | Starner et al. |
| 8,482,527 B1 | 7/2013 | Kim |
| 8,493,366 B2 | 7/2013 | Bathiche et al. |
| 8,497,841 B1 | 7/2013 | Sze et al. |
| 8,576,173 B2 | 11/2013 | Verhaegh et al. |
| 8,600,166 B2 | 12/2013 | Adhikari |
| 8,755,568 B2 | 6/2014 | Adhikari |
| 8,774,464 B2 | 7/2014 | Adhikari |

(Continued)

FOREIGN PATENT DOCUMENTS

| | | |
|---|---|---|
| CN | 103221901 A | 7/2013 |
| CN | 103221902 A | 7/2013 |

(Continued)

*Primary Examiner* — Pegeman Karimi
(74) *Attorney, Agent, or Firm* — Jefferson IP Law, LLP

(57) ABSTRACT

A virtual input device using a projector and a method for receiving a user input using the same are provided. The virtual input device includes a first sensor configured to detect at least one user hand, a processor configured to determine a virtual input layout based on the detected at least one user hand, a projector configured to optically project the determined virtual input layout on a user input plane, and a second sensor configured to detect a user input through the projected virtual input layout.

16 Claims, 23 Drawing Sheets

(56) References Cited

U.S. PATENT DOCUMENTS

| | | | |
|---|---|---|---|
| 8,937,596 B2 | 1/2015 | Sze et al. | |
| 9,069,164 B2 | 6/2015 | Starner et al. | |
| 9,244,563 B2 | 1/2016 | Nam Goong et al. | |
| 2002/0149569 A1 | 10/2002 | Dutta et al. | |
| 2004/0046744 A1 | 3/2004 | Rafii et al. | |
| 2004/0108990 A1* | 6/2004 | Lieberman | H03K 17/9638 345/156 |
| 2004/0218963 A1 | 11/2004 | Van Diepen et al. | |
| 2005/0225538 A1 | 10/2005 | Verhaegh et al. | |
| 2006/0114233 A1* | 6/2006 | Radivojevic | G06F 3/0426 345/168 |
| 2006/0209020 A1 | 9/2006 | Scheiblhuber | |
| 2009/0231281 A1* | 9/2009 | Whytock | G06F 3/04886 345/168 |
| 2009/0295730 A1* | 12/2009 | Shin | G06F 3/0221 345/168 |
| 2010/0164869 A1* | 7/2010 | Huang | G06F 3/043 345/168 |
| 2010/0302165 A1 | 12/2010 | Li | |
| 2011/0109577 A1 | 5/2011 | Lee et al. | |
| 2011/0110560 A1 | 5/2011 | Adhikari | |
| 2011/0134130 A1 | 6/2011 | Choi et al. | |
| 2011/0216015 A1* | 9/2011 | Edwards | G06F 3/041 345/173 |
| 2012/0075173 A1 | 3/2012 | Ashbrook et al. | |
| 2012/0075196 A1 | 3/2012 | Ashbrook et al. | |
| 2012/0146916 A1 | 6/2012 | Goong et al. | |
| 2012/0192093 A1* | 7/2012 | Migos | G06F 3/04883 715/773 |
| 2013/0016070 A1 | 1/2013 | Starner et al. | |
| 2014/0015757 A1 | 1/2014 | Li | |
| 2014/0022164 A1 | 1/2014 | Adhikari | |
| 2014/0022216 A1* | 1/2014 | Nakamura | G06F 3/0233 345/174 |
| 2014/0028550 A1 | 1/2014 | Adhikari | |
| 2014/0055364 A1* | 2/2014 | Sze | G06F 3/02 345/169 |
| 2014/0078043 A1 | 3/2014 | Kim | |
| 2014/0078176 A1 | 3/2014 | Kim et al. | |
| 2014/0139474 A1 | 5/2014 | Nam Goong et al. | |
| 2014/0327611 A1 | 11/2014 | Ono et al. | |
| 2014/0368458 A1 | 12/2014 | Nam Goong et al. | |
| 2015/0268730 A1* | 9/2015 | Walline | G06F 3/017 345/168 |
| 2015/0268799 A1 | 9/2015 | Starner et al. | |

FOREIGN PATENT DOCUMENTS

| | | |
|---|---|---|
| EP | 0 982 676 A1 | 3/2000 |
| GB | 2470653 A | 12/2010 |
| KR | 10-2002-0079847 A | 10/2002 |
| KR | 10-1411569 B1 | 6/2014 |

* cited by examiner

VIRTUAL INPUT DEVICE AND METHOD FOR RECEIVING USER INPUT USING THE SAME

CROSS-REFERENCE TO RELATED APPLICATION(S)

This application claims the benefit under 35 U.S.C. § 119(a) of a Korean patent application filed on Jan. 16, 2015 in the Korean Intellectual Property Office and assigned Serial number 10-2015-0007917, the entire disclosure of which is hereby incorporated by reference.

TECHNICAL FIELD

The present disclosure relates to a virtual input device and a method for receiving a user input using the same.

BACKGROUND

With the development of wireless technologies, an electronic device is easy to carry and is able to freely connect to wired/wireless networks. For example, portable electronic devices such as a smartphone, a tablet personal computer (PC), and the like is able to support various functions, such as an internet connection and chatting, in addition to a call function and a message sending/receiving function.

To support the various functions, the portable electronic device is generally equipped with a touch panel on the display, thereby receiving various inputs (e.g., a touch input, an alphabet input, and the like) from a user. For example, the portable electronic device is able to display a so-called soft key in which a keyboard or call buttons are displayed on the display, and the user is able to input on the soft-key displayed on the touch panel bonded with the display.

The portable electronic device may inevitably be minimized to promote the user's convenience in carrying. For example, the size of the smartphone display is generally limited to 4 inches to 6 inches even though there is a trend to increase the size of the smartphone display as large as possible. When the user enters a user input through the soft key displayed on the 4-inch to 6-inch display, the speed and the accuracy significantly drop compared with when a general keyboard is used. Furthermore, the soft key of a smartphone is not suitable to input a large amount of data (e.g., documentation) in the smartphone.

For a tablet PC, if a soft key is displayed, the area of the screen for displaying content is reduced. In this situation, the user has to input information while watching the screen covered by the soft key, thereby significantly reducing the input efficiency. Furthermore, even though the tablet PC has a 10-inch display, a user who has a relatively large hand may easily make typing errors due to constraints of the screen size of the tablet PC.

Furthermore, in the case where the soft key is used in a smartphone or a tablet PC, the user needs to operate settings to change a key layout or a key type. The separate operation for changing the settings may be very inconvenient to the user who wants to use various input layouts. Furthermore, the separate operation for changing the settings may be very difficult to the users (e.g., the elderly people) who are unfamiliar with the use of electronic devices.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a virtual input layout, which is most suitable to a user, through a projector based on characteristics (including the number of hands) of a user hand, a location of the user hand, a movement (gesture) of the user hand, and the like which are detected using various sensors.

In accordance with an aspect of the present disclosure, a virtual input device is provided. The virtual input device includes a first sensor configured to detect at least one user hand, a processor configured to determine a virtual input layout based on the detected at least one user hand, a projector configured to project the determined virtual input layout on a user input plane, and a second sensor configured to detect a user input through the projected virtual input layout.

In accordance with another aspect of the present disclosure, a method for receiving a user input is provided. The method includes detecting at least one user hand, determining a virtual input layout based on the detected at least one user hand, optically projecting the determined virtual input layout on a user input plane, and detecting a user input through the projected virtual input layout.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
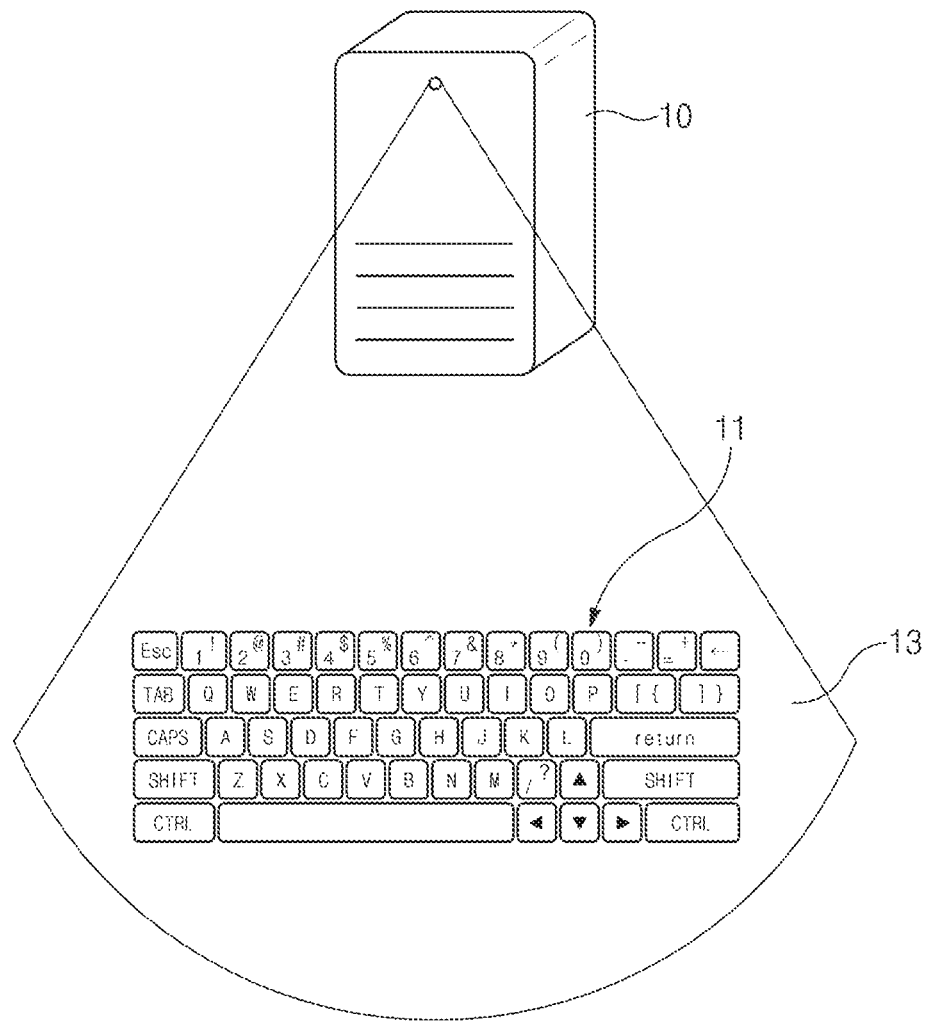
FIGS. 1A to 1C are diagrams illustrating a virtual input device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, the expressions "have", "may have", "include" and "comprise", or "may include" and "may comprise" used herein indicate existence of corresponding features (e.g., elements such as numeric values, functions, operations, or components) but do not exclude presence of additional features.

In the present disclosure, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms do not limit the order and/or priority of the elements. For example, "a first user device" and "a second user device" indicate different user devices. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Moving Picture Experts Group phase 1 or phase 2 (MPEG-1 or MPEG-2) audio layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart watches, and the like.

According to various embodiments of the present disclosure, the electronic devices may be smart home appliances. The smart home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles (e.g., Xbox™ and PlayStation™), electronic dictionaries, electronic keys, camcorders, electronic picture frames, and the like.

According to various embodiments of the present disclosure, the electronic devices may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices) receiving a user input in an idle mode, navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment of the present disclosure, the electronic devices may include at least one of furniture or buildings/structures, electronic boards, electronic signature receiving devices, projectors, or various measuring instruments (e.g., water meters, electricity meters, gas meters, or wave meters, and the like). The electronic devices according to an embodiment of the present disclosure may be one or more combinations of the above-mentioned devices. According to an embodiment of the present disclosure, an electronic device may be a flexible electronic. Also, electronic devices according to various embodiments of the present disclosure are not limited to the above-mentioned devices, and may include new electronic devices according to technology development.

Hereinafter, virtual input devices according to various embodiments of the present disclosure will be described with reference to the accompanying drawings. The term "user" used herein may refer to a person who uses an electronic device or may refer to a device (e.g., an artificial electronic device) that uses an electronic device.

Figure 1B:
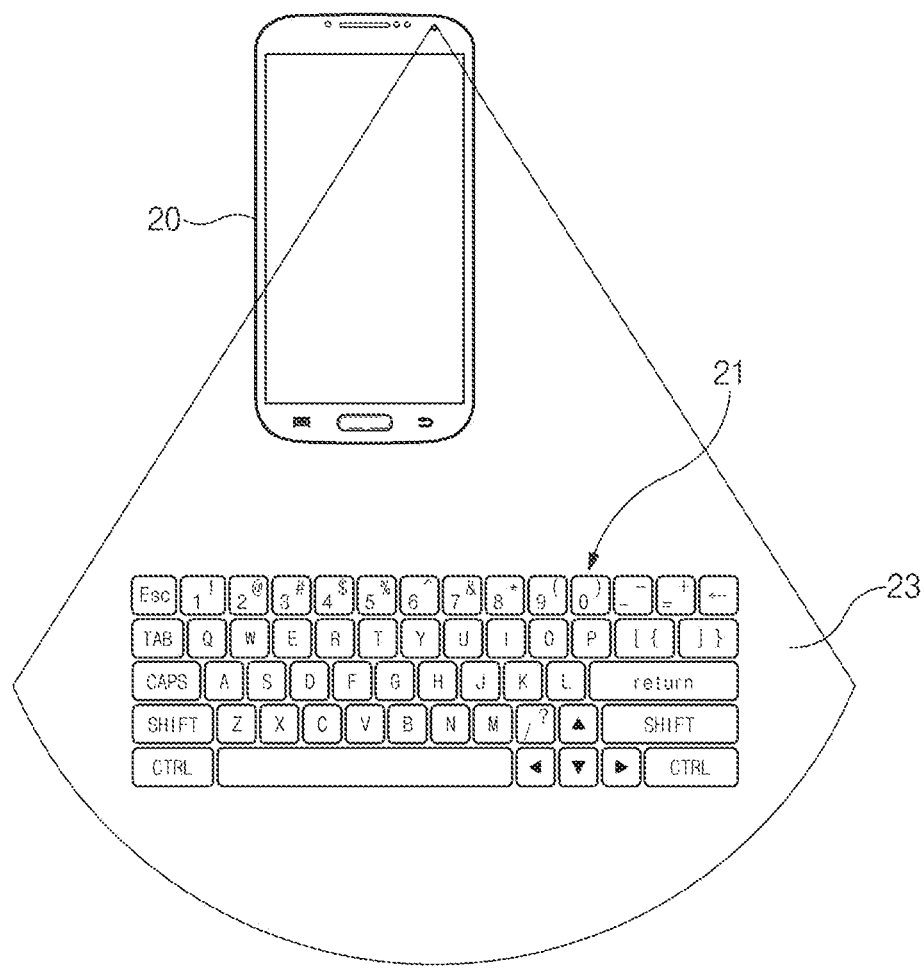
Figure 1C:
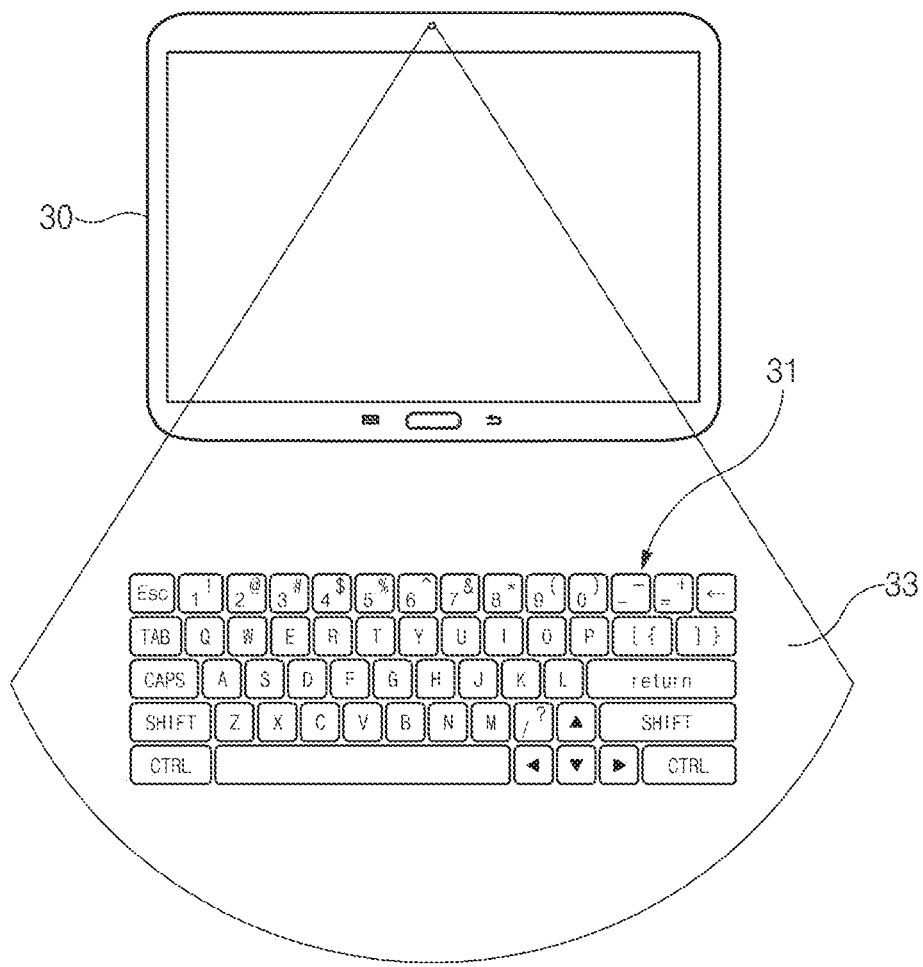

FIGS. 1A to 1C are diagrams illustrating a virtual input device according to various embodiments of the present disclosure.

Referring to FIG. 1A, a virtual input device 10 according to an embodiment of the present disclosure is illustrated. For example, the virtual input device 10 may be connected to the above-mentioned types of electronic devices with a universal serial bus (USB) or a Bluetooth or may be mounted on the electronic device.

The virtual input device 10 may detect a user hand. For example, the virtual input device 10 may detect a size, a location, or the number of user hands (or fingers) or a gesture by the user hand. The virtual input device 10 may determine a virtual input layout which is to be provided to the user, based on the size of the user hand (or finger), the location thereof, the number of user hands (or fingers), or the gesture of the user hand (or finger(s)). The virtual input layout may be different from an input device implemented with hardware, such as a keyboard. The virtual input layout may refer to intangible rendering about a shape of the input device, which is generated by an optical projection device (e.g., a projector).

The virtual input device 10 may project a virtual input layout on a user input plane using the optical projection device. For example, in FIG. 1A, a virtual input layout 11 may be projected on a user input plane 13 from the virtual input device 10 and may have a shape of a keyboard, where the user plane may also be referred to as a projection plane and may be any suitable surface such as a table top, the ground, a wall, or an object for example that the user virtual user input layout may be projected onto.

The user may perform a user input (e.g., a keyboard typing) through the virtual input layout 11 projected on the user input plane 13. For example, the virtual input device 10 may detect the user input using a three-dimensional (3D) sensor and may convert the detected user input to an electric signal and may transmit the electric signal to an electronic device connected to the virtual input device 10.

Referring to FIG. 1B, there is illustrated an example in which a virtual input device 20 according to an embodiment of the present disclosure is mounted on a smartphone. For example, the virtual input device 20 may have a configuration corresponding to the above-mentioned virtual input device 10 and may perform the corresponding operation.

For example, if the virtual input device 20 is mounted on a smartphone, portability or multi-functionalities of the smartphone may be supported. A user may perform a user input through a virtual input layout 21 projected on a user input plane 23 from the virtual input device 20 mounted on the smartphone. If the virtual input device 20 is mounted on the smartphone, a soft key may not be displayed on a touch display (display bonded with a touch panel) included in the smartphone, thereby overcoming constraints of the size of the smartphone equipped with a display of a limited size.

Referring to FIG. 1C, there is illustrated an example in which a virtual input device 30 according to an embodiment of the present disclosure is mounted on a tablet PC. The virtual input device 30 may have a configuration corresponding to the above-mentioned virtual input device 10 and may perform the corresponding operation.

For example, if the virtual input device 30 is mounted on a tablet PC, portability or multi-functionalities may be supported like a smartphone. A user may perform a user input through a virtual input layout 31 projected on a user input plane 33 from the virtual input device 30 mounted on the tablet PC. Since the tablet PC has a relatively large screen of a touch display compared with a screen of a smartphone, the user may achieve the same effect as obtained when a laptop PC is used.

Figure 2:
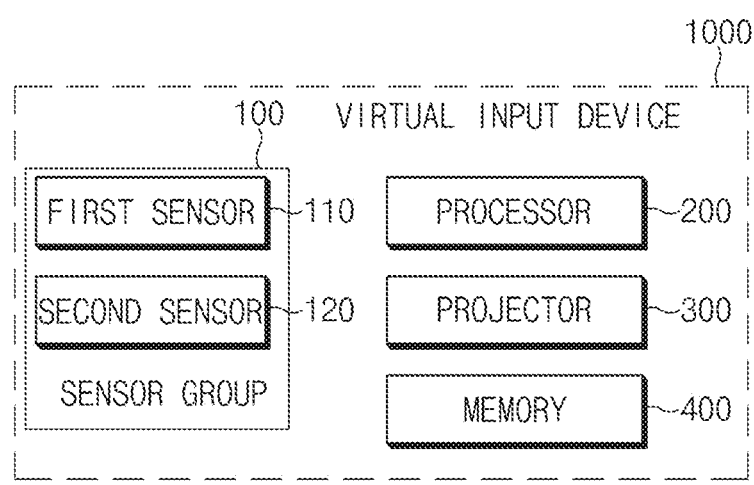
FIG. 2 is a block diagram illustrating a configuration of a virtual input device according to an embodiment of the present disclosure.

FIG. 2 is a block diagram illustrating a configuration of a virtual input device 1000 according to an embodiment of the present disclosure.

Referring to FIG. 2, a virtual input device 1000 according to an embodiment of the present disclosure may include a sensor group 100 which includes a first sensor 110 and a second sensor 120, a processor 200, a projector 300, and a memory 400.

The first sensor 110 may detect a user hand. For example, the first sensor 110 may detect at least one or more of a size of a hand or a finger of a user, a location of the user hand, the number of user hands, whether a user hand is a left hand or a right hand, a spacing between a right hand and a left hand of the user, and a gesture by a body of the user (e.g., a hand).

The second sensor 120 may detect a user input from a virtual input layout projected on a user input plane. For example, the second sensor 120 may obtain depth information about an image of a user finger and 3D depth information about a user input plane. The second sensor 120 may detect a 3D depth between an image of a user finger and an image of a user input plane on which a virtual input layout is projected. The second sensor 120 may detect whether any finger touches any key of a virtual input layout based on the 3D depth.

The first sensor 110 and the second sensor 120 may be respectively implemented with at least one or more of an image sensor (e.g., a camera) which detects an image of a user hand, a 3D sensor which tracks and detects a movement of the user hand, an infrared sensor, or an ultrasonic sensor or a combination of two or more thereof. However, the scope and spirit of the present disclosure may not be limited thereto. For example, the first sensor 110 and the second sensor 120 may be integrated into a chipset (e.g., the sensor group 100). The first and second sensors may also be the same sensor (i.e. a single sensor) or may be implemented as separate sensors.

The processor 200 may determine a virtual input layout which the projector 300 projects, based on a user hand detected by the first sensor 110. Items which the processor 200 determines may include, for example, a type of a virtual input layout (e.g., a keyboard layout, a key pad layout, and the like), a size and a shape of a key included in the virtual input layout, and a location on which the virtual input layout is projected.

For example, the processor 200 may adjust an area of a key included in the virtual input layout or a spacing between keys included therein, based on a size of a hand (or a finger) detected by the first sensor 110. Accordingly, a virtual input layout which has a large-size key or a virtual input layout which has a wide spacing between keys may be provided to a user with a large hand.

Furthermore, the processor 200 may determine to project the virtual input layout on a location corresponding to a location of a user hand detected by the first sensor 110. For example, under control of the processor 200, the virtual input layout may be projected around a location on which the detected user hand is placed.

Furthermore, if the first sensor 110 detects a specific gesture, the processor 200 may determine to project a virtual input layout corresponding to the detected specific gesture. The specific gesture may correspond to a specific virtual input layout. The correspondence may be stored in the memory 400. For example, a gesture in which a user unfolds an index finger and moves the index finger from left to right in a state where remaining fingers other than the index finger are folded may be determined to correspond to a layout of Hangul (Hangul means Korean alphabet) 2-set keyboard and data about this kind of correspondence may be stored in the memory 400.

Furthermore, the processor 200 may allow the projector 300 to project a virtual input layout suitable for the number of user hands, based on the number of user hands detected by the first sensor 110.

For example, if the number of user hands detected by the first sensor 110 is one, the processor 200 may determine to project a one-hand-support virtual input layout. The one-hand-support virtual input layout may mean a virtual input layout in which a user effectively performs a data input with only one hand. Therefore, a virtual input layout (e.g., a keyboard layout) which is typically planned to use both hands (both left and right hands) even though a data input is possible with one hand may not be called as a one-hand-support virtual input layout. The one-hand-support virtual input layout may include a key pad layout, a joy-pad layout, or a tracking point layout. The one-hand-support virtual input layout may not be limited to the above-mentioned example.

The one-hand-support virtual input layout may be a key pad layout based on 3-by-4 keys. The key pad layout based on 3-by-4 keys may include a layout of Chunjiin, Naratgul, or Sky Hangul, which are adapted as Korean alphabet (hereinafter, referred to as "Hangul") input national standards. Furthermore, the key pad layout based on 3-by-4 keys may include a 10-key layout with alphabet or a key pad layout which includes various emoticons.

For another example, if the number of user hands detected by the first sensor 110 is two, the processor 200 may determine to project a two-hand-support virtual input layout. The two-hand-support virtual input layout may mean a virtual input layout which allows a user to effectively input data with both hands.

The both hands may be a left and right hand of the same user or the same-side hands of different users (e.g., a left hand of a user A and a left hand of a user B). For example, the two-hand-support virtual input layout may include a keyboard layout for left and right hands of the same user or two one-hand-support virtual input layouts (so-called, a virtual input layout for two people).

For example, if the user's two hands detected by the first sensor 110 include a right hand and a left hand, the processor 200 may determine to project a keyboard layout as the two-hand-support virtual input layout. Furthermore, if the user's two hands detected by the first sensor 110 include either two right hands or two left hands, the processor 200 may determine to project a plurality of one-hand-support virtual input layouts as the two-hand-support virtual input layout.

The keyboard layout may comply with the standards specified by the various countries of the world. For example, the keyboard layout may be one of QWERTY keyboard, DVORAK keyboard, COLEMAK keyboard, QWERTZ keyboard, AZERTY keyboard, Hangul 2-set keyboard, Hangul 3-set keyboard, or Japanese industrial standard (JIS) keyboard.

Furthermore, according to an embodiment of the present disclosure, the first sensor 110 may further detect a spacing between a right hand and a left hand of a user. If the spacing between the right hand and the left hand is greater than a specific spacing, the processor 200 may determine to project a split keyboard layout as the keyboard layout. The split keyboard layout may be a keyboard layout in which keys for input using a left hand of a user are separated from keys for input using a right hand of a user.

Meanwhile, if the number of user hands detected by the first sensor 110 is greater than or equal to three, the virtual input device 1000 may receive user inputs from two or more users. Therefore, the processor 200 may determine to project a plurality of virtual input layouts. For example, if the number of user hands detected by the first sensor 110 is three, the processor 200 may determine to project three one-hand-support virtual input layouts or both one one-hand-support virtual input layout and one two-hand-support virtual input layout.

The projector 300 may optically project a virtual input layout determined by the processor 200 on a user input plane. According to an embodiment of the present disclosure, the projector 300 may include a laser projector to project a virtual input layout more clearly.

According to various embodiments of the present disclosure, the projector 300 may further include a general projector which is able to project content (e.g., an image, a video, a character, or the like) of a large screen on a user input plane. In this case, a user may be able to perform a user input through a virtual input layout while watching projected content, thereby improving the user's convenience.

The memory 400 may store various data, such as data about various virtual input layouts which the projector 300 is able to optically project, data about various characteristic information about a user hand detected by the first sensor 110, data about a gesture of a user hand, data about correspondence between a virtual input layout and a gesture, and the like. According to various embodiments of the present disclosure, the memory 400 may store a program for implementing a method for receiving a user input, which will be explained later.

Figure 3:
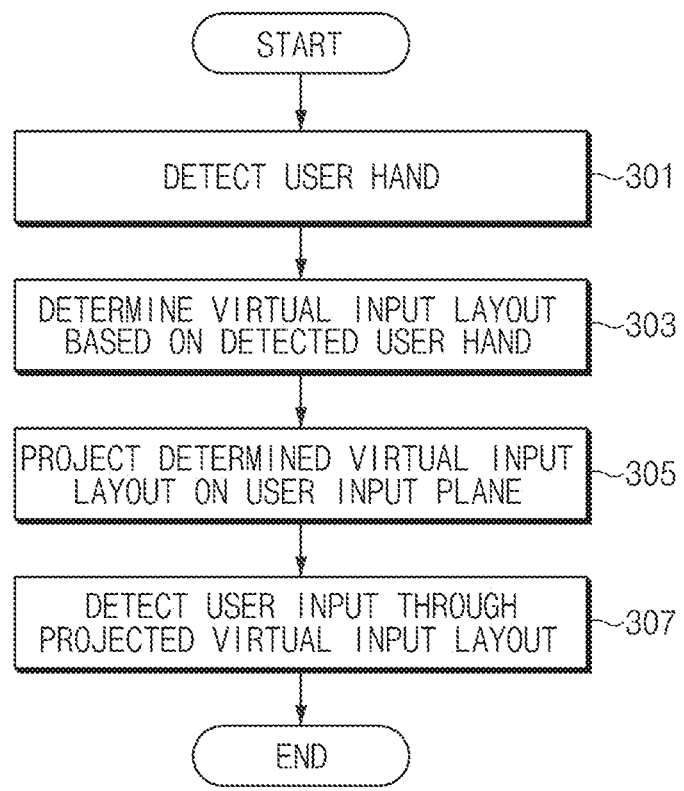
FIG. 3 is a flowchart illustrating a user input receiving method according to an embodiment of the present disclosure.

FIG. 3 is a flowchart illustrating a user input receiving method according to an embodiment of the present disclosure.

Referring to FIG. 3, a user input receiving method according to an embodiment of the present disclosure may include operations 301 to 307.

In operation 301, the first sensor 110 may detect a user hand. For example, the first sensor 110 may detect at least one or more of a size of a hand or a finger of a user, a location of the user hand, the number of the user hands, whether the user hand is a left hand or a right hand, a spacing between a left hand and a right hand of the user, and a gesture by a body of the user (e.g., hand).

In operation 303, the processor 200 may determine a virtual input layout based on the user hand detected in operation 301. For example, the processor 200 may determine a type and a shape of a layout based on a size of a hand or a finger of the user, a location of the user hand, the number of the user hands, whether the user hand is a left hand or a right hand, a spacing between the user's left hand and the user's right hand, or a gesture by the user hand.

In operation 305, the projector 300 may optically project the virtual input layout determined in operation 303 on a user input plane. For example, the projector 300 may use a laser projector for projecting the virtual input layout. Furthermore, the projector 300 may further include a general projector, thereby further projecting content, such as an image, a video, a character, and the like, as well as the virtual input layout using the general projector.

In operation 307, the second sensor 120 may detect a user input from the virtual input layout projected on the user input plane. For example, 3D depth may be used to detect a user input through a virtual input layout.

Figure 4:
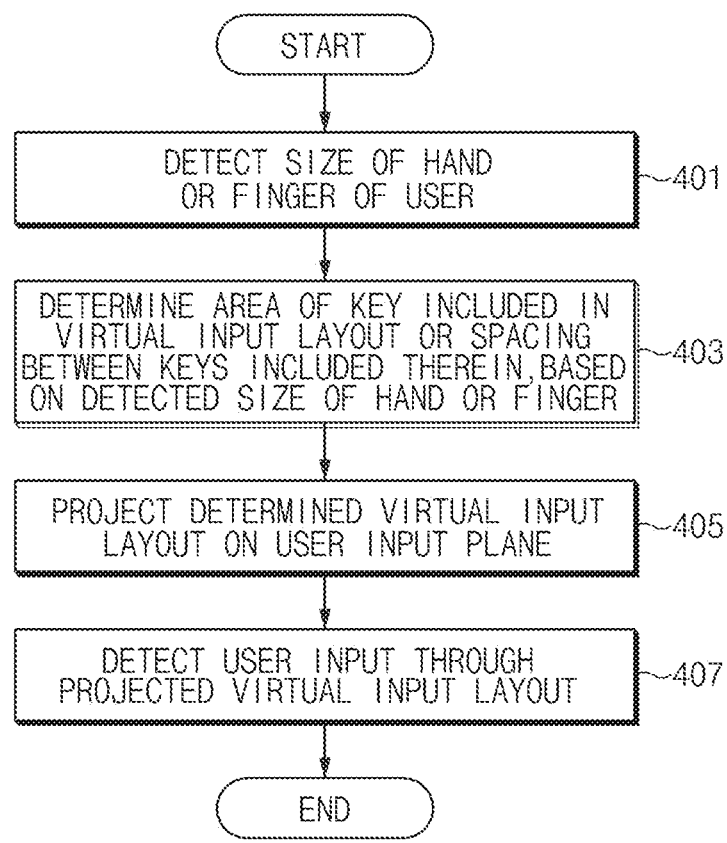
FIG. 4 is a flowchart illustrating a user input receiving method based on a size of a hand or a finger of a user according to an embodiment of the present disclosure.

FIG. 4 is a flowchart illustrating a user input receiving method based on a size of a hand or a finger of a user according to an embodiment of the present disclosure.

Referring to FIG. 4, a user input receiving method based on a size of a hand or a finger of a user may include operations 401 to 407. Operations 405 and 407 correspond to operations 305 and 307 of FIG. 3, and a detailed description thereof is thus omitted.

In operation 401, the first sensor 110 may detect a size of a user hand or a size (or a thickness) of a finger of the user hand. To detect a size of a hand or a finger of a user, specific image processing or an object characteristic recognition method may be applied.

In operation 403, the processor 200 may determine an area of a key included in a virtual input layout which is to be projected according to the size (or the thickness) detected in operation 401 or a spacing between keys included therein. Thereby, the virtual input device 1000 may provide a virtual input layout, in which a key has a relatively large area, to a user who has a relatively large hand or a virtual input layout, in which a key has a relatively small area, to a user who has a relatively small hand. Furthermore, the virtual input device 1000 may provide a virtual input layout, in which a spacing between keys is a relatively wide, to a user who has a relatively thick finger or a virtual input layout, in which a spacing between keys is a relatively narrow, to a user who has a relatively thin finger.

Figure 5A:
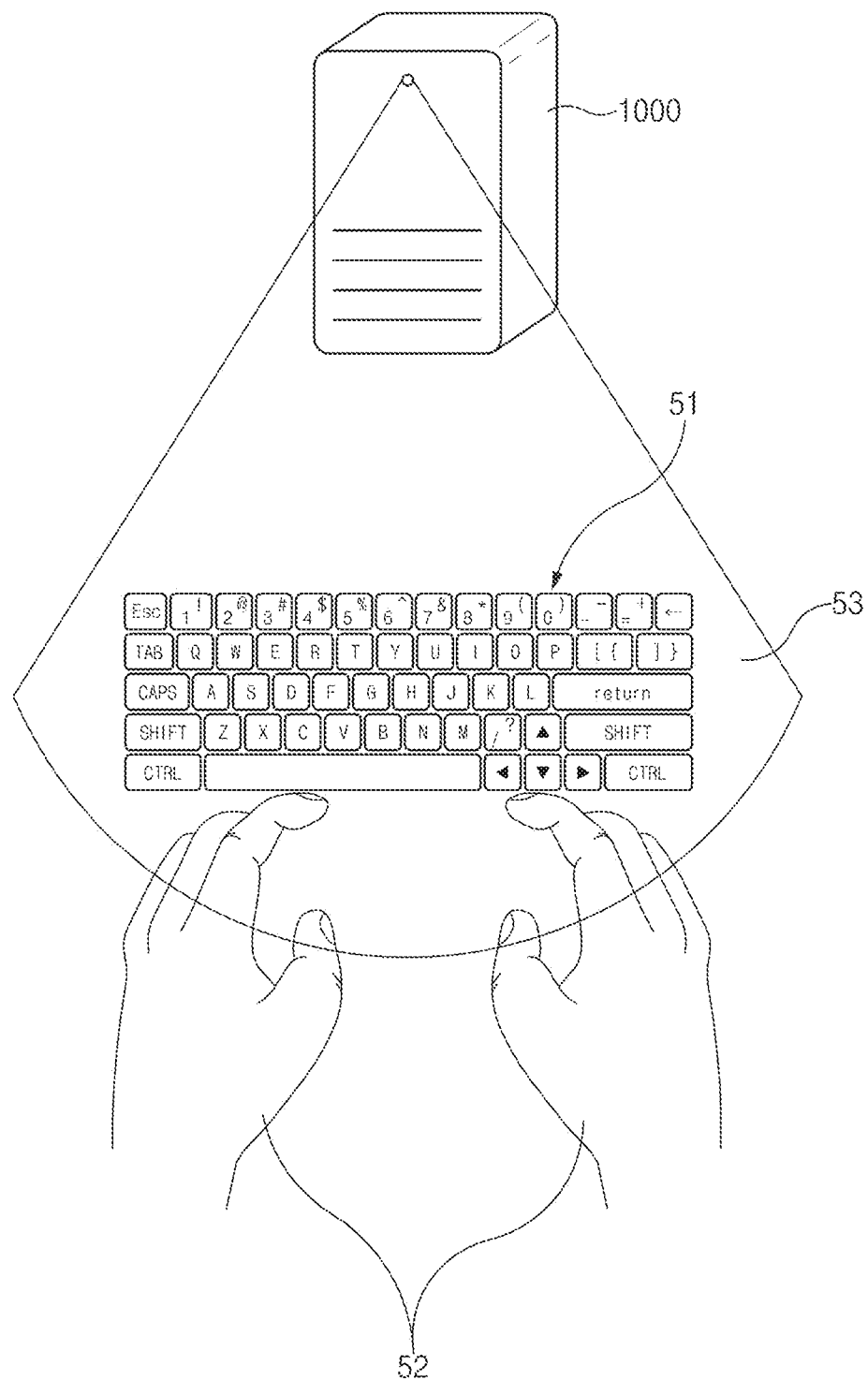
FIGS. 5A and 5B are diagrams illustrating a user input receiving method according to an embodiment of the present disclosure, which is performed based on a size of a hand or a finger of a user is used.
Figure 5B:
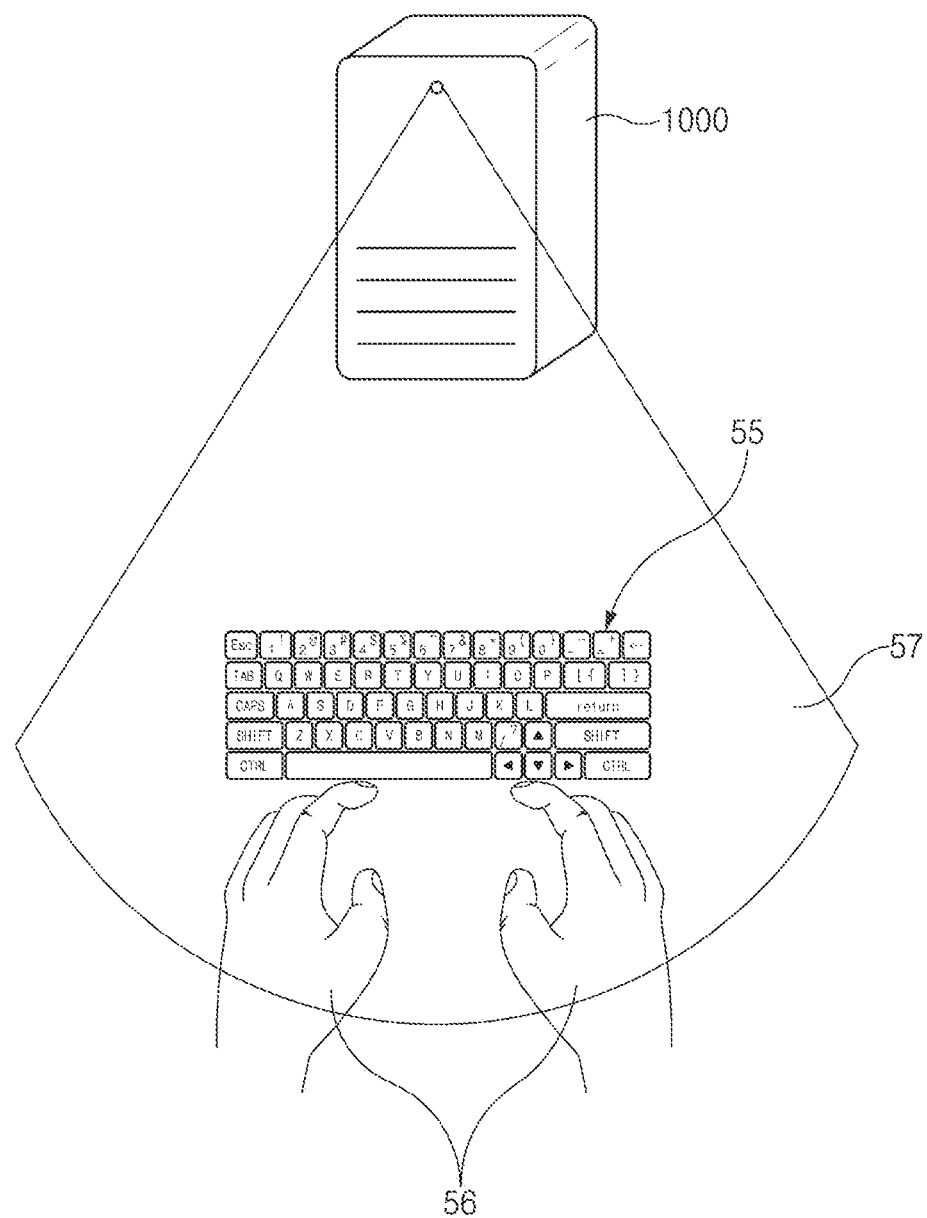

FIGS. 5A and 5B are diagrams illustrating a user input receiving method according to an embodiment of the present disclosure, which is performed based on a size of a hand or a finger of a user is used.

Referring to FIG. 5A, the first sensor 110 may detect a user hand 52 or a finger included in the user hand 52. Since the detected user hand 52 is relatively large and the finger of the detected user hand 52 is relatively thick, the processor 200 may set an area of a key to be large or may set a spacing between keys to be wide, the key(s) included in a virtual input layout 51 which is to be projected on a user input plane 53 from the virtual input device 1000.

In contrast, referring to FIG. 5B, the first sensor 110 may detect a user hand 52 or a finger included in the user hand 52. Since the detected user hand 56 is relatively small and the finger of the detected user hand 56 is relatively thin, the processor 200 may set an area of a key small or may set a spacing between keys narrow, the key(s) included in a virtual input layout 55 which is projected on a user input plane 57 from the virtual input device 1000.

Figure 6:
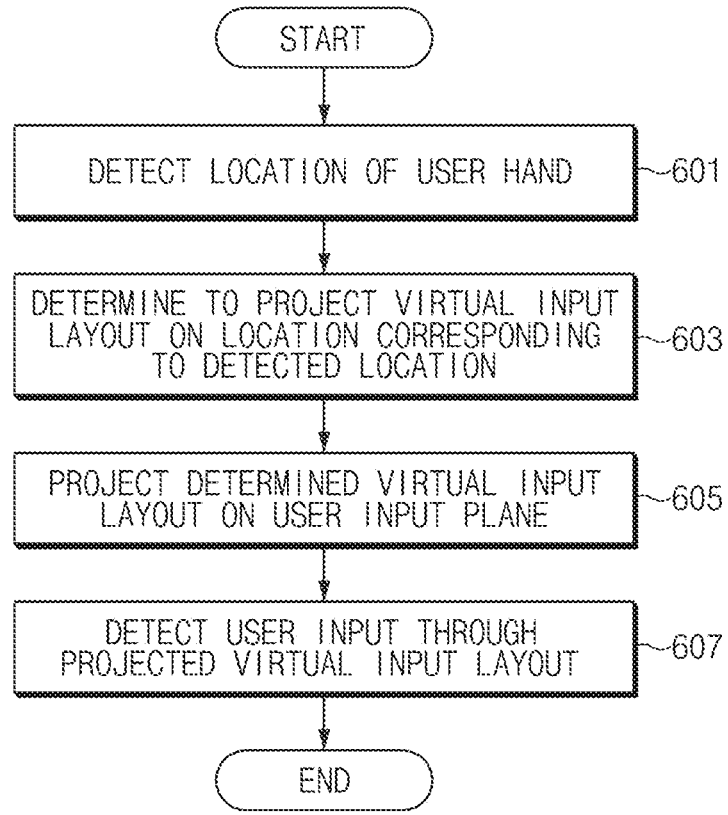
FIG. 6 is a flowchart illustrating a user input receiving method based on a location of a user hand according to an embodiment of the present disclosure.

FIG. 6 is a flowchart illustrating a user input receiving method based on a location of a user hand according to an embodiment of the present disclosure.

Referring to FIG. 6, a user input receiving method based on a location of a user hand may include operations 601 to 607. Operations 605 and 607 correspond to operations 305 and 307 of FIG. 3, and a detailed description thereof is thus omitted.

In operation 601, the first sensor 110 may detect a location of a user hand on a user input plane. For example, to detect a location of a user hand, specific image processing or an object characteristic recognition method may be applied.

In operation 603, the processor 200 may determine to project a virtual input layout on a location corresponding to the location detected in operation 601. Furthermore, the processor 200 may determine to project the virtual input layout in front of the location of the detected user hand, that is, on a space in front of an end of a finger.

Figure 7A:
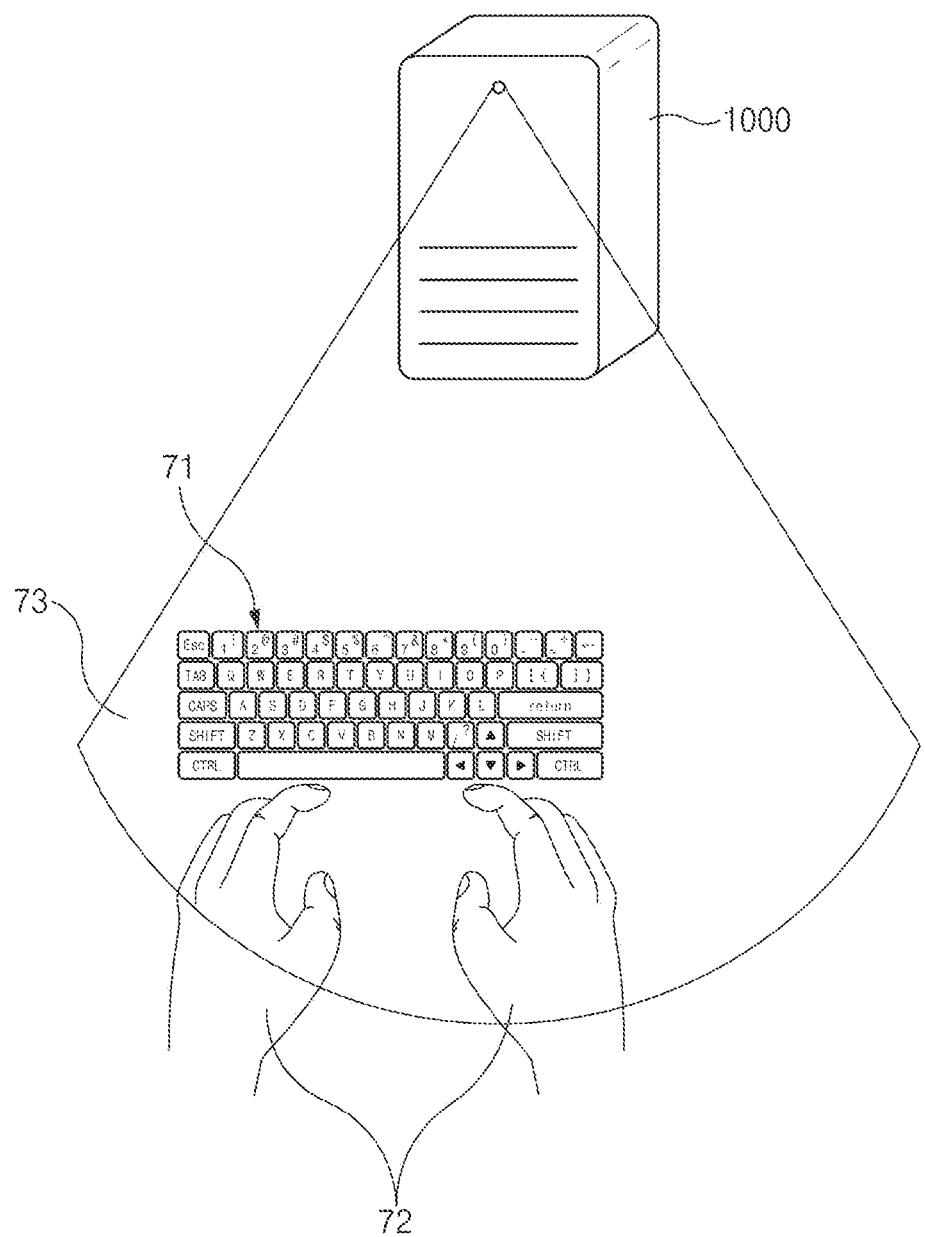
FIGS. 7A and 7B are diagrams illustrating a user input receiving method according to an embodiment of the present disclosure, which is performed based on a location of a user hand is used.
Figure 7B:
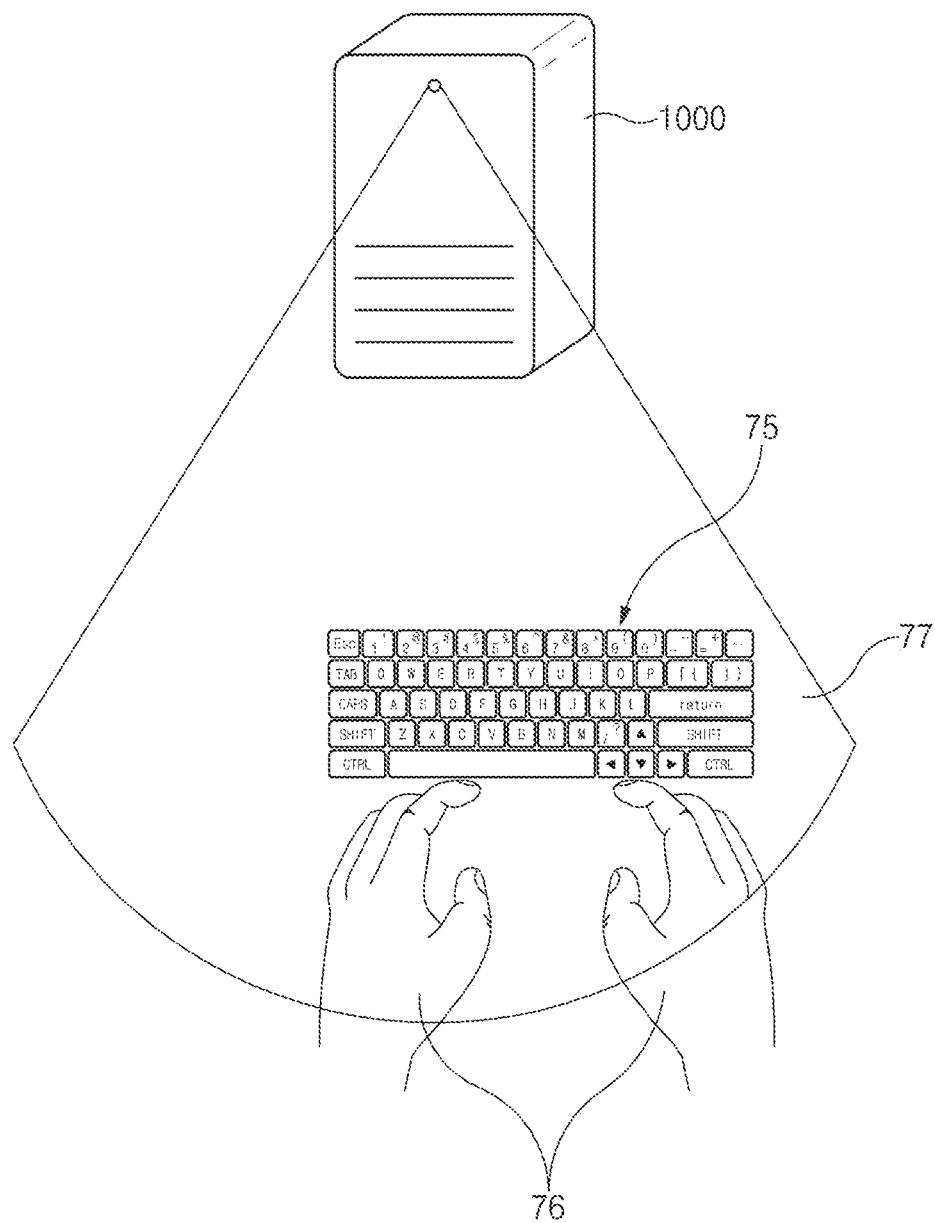

FIGS. 7A and 7B are diagrams illustrating a user input receiving method according to an embodiment of the present disclosure, which is performed based on a location of a user hand is used.

Referring to FIG. 7A, the first sensor 110 may detect a location of a user hand 72. Since the detected user hand 72 is located at the left side of the user, that is, at the left side of a user input plane 73, the processor 200 may project a virtual input layout 71 in front of the user hand 72 from the virtual input device 1000.

Furthermore, referring to FIG. 7B, the first sensor 110 may detect a location of a user hand 76. Since the detected user hand 76 is located at the right side based on the user, that is, at the right side of a user input plane 77, the processor 200 may project a virtual input layout 75 in front of the user hand 76 from the virtual input device 1000.

Figure 8:
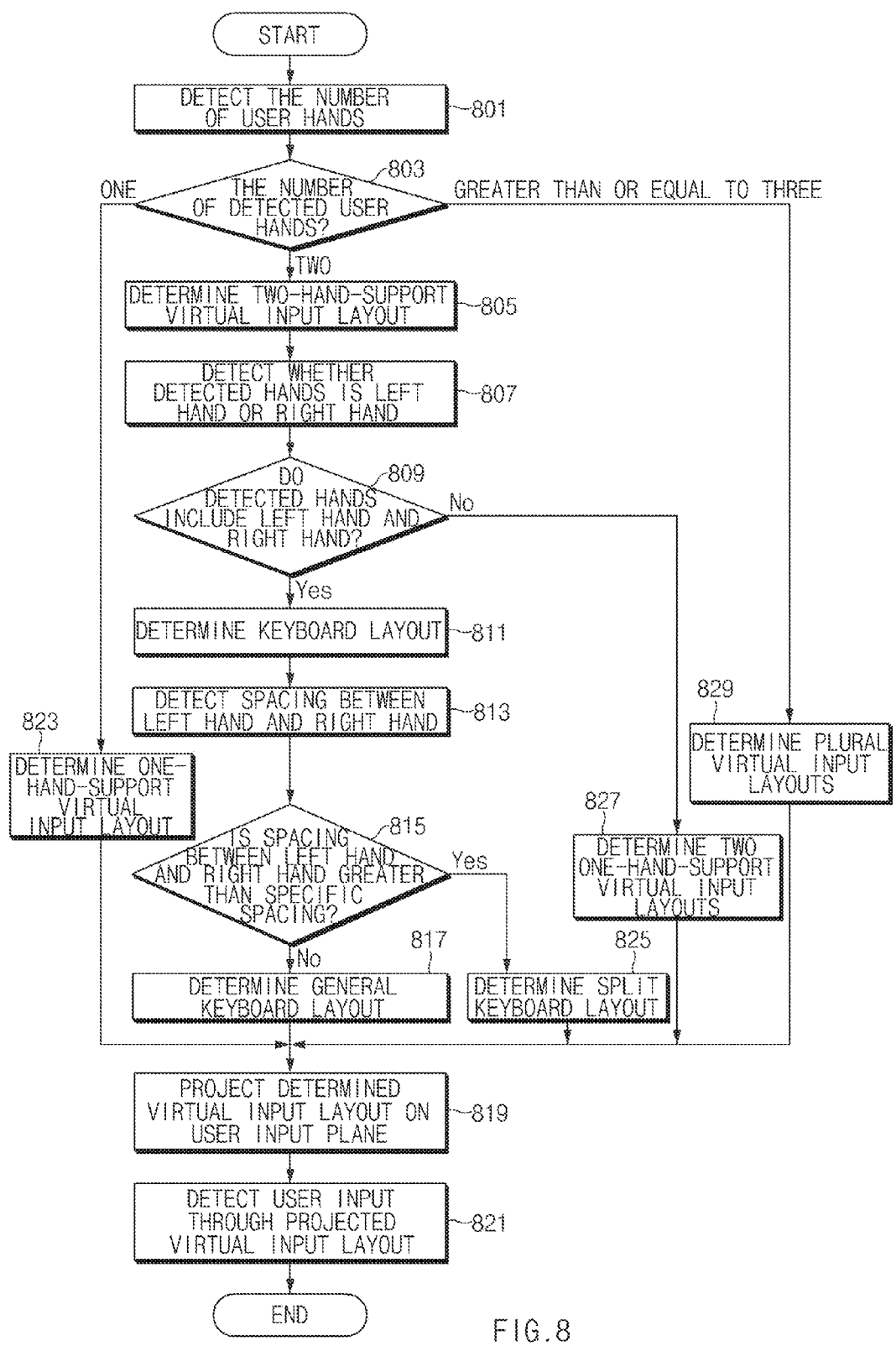
FIG. 8 is a flowchart illustrating a user input receiving method based on the number of user hands according to an embodiment of the present disclosure.

FIG. 8 is a flowchart illustrating a user input receiving method based on the number of user hands according to an embodiment of the present disclosure.

Referring to FIG. 8, a user input receiving method based on the number of user hands may include operations 801 to 829.

In operation 801, the first sensor 110 may detect the number of user hands. According to various embodiments of the present disclosure, the first sensor 110 may detect the number of fingers, and may detect the number of hands based on the number of the fingers.

In operation 803, the processor 200 may determine the number of the hands detected in operation 801. For example, the processor 200 may determine the number of the hands detected in operation 801 through specific image processing. In the case where the number of the hands is one, the procedure may proceed to operation 823. In the case where the number of the hands is two, the procedure may proceed to operation 805. In the case where the number of the hands is greater than or equal to three, the procedure may proceed to operation 829.

Since the number of the detected hands is two, in operation 805, the processor 200 may determine to project a two-hand-support virtual input layout as a virtual input layout to be projected. Since various types of layouts are possible in a two-hand-support virtual input layout, additional determinations, such as operations 809 and 815, may be required.

In operation 807, the first sensor 110 may detect whether each of the user's two hands thus detected is a left hand or a right hand.

In operation 809, the processor 200 may determine whether the two hands detected in operation 807 include both a left hand and a right hand. That is, the processor 200 may determine whether the detected two hands belong to the same user. If the two hands detected in operation 807 include both a left hand and a right hand, the procedure may proceed to operation 811. However, if the detected two hands are either two left hands or two right hands (that is, the case where it is determined that two users exist), the procedure may proceed to operation 827.

In operation 811, in the case where the detected two hands include both a left hand and a right hand, that is, in the case where the detected two hands belong to the same user, the processor 200 may determine to project a keyboard layout as a two-hand-support virtual input layout to be projected.

In operation 813, the first sensor 110 may detect a spacing between the left hand and the right hand of the detected two hands.

In operation 815, the processor 200 may determine whether the spacing between the left hand and the right hand detected in operation 813 is greater than a specific spacing. In the case where the detected spacing is greater than the specific spacing, the procedure may proceed to operation 825. If not, the procedure may proceed to operation 817.

In the case where the spacing between the left hand and the right hand detected in operation 813 is not greater than the specific spacing, in operation 817, the processor 200 may allow the projector 300 to project a general keyboard layout (that is, a keyboard layout in which keys are successively arranged to receive inputs from both a left hand and a right hand) as a keyboard layout to be projected.

In operation 819, the projector 300 may optically project the virtual input layout determined in operation 817, 823, 825, 827, or 829 on a user input plane.

In operation 821, the second sensor 120 may detect a user input through the virtual input layout projected on the user input plane in operation 819.

Operation 823 may be processed in the case where the number of the hands determined in operation 803 is one. Therefore, the processor 200 may allow the projector 300 to project a one-hand-support virtual input layout.

In the case where the number of the detected hands is two, in the case where the two hands include both a left hand and a right hand, and in the case where the spacing between a left hand and a right hand is greater than the specific spacing, operation 825 may be processed. Therefore, the processor 200 may allow the projector 300 to project a split keyboard layout as a keyboard layout to be projected.

In the case where the number of the detected hands is two, and in the case where the two hands do not include both a left hand and a right hand, that is, the two hands include either two left hands or two right hands, operation 827 may be processed. Therefore, the processor 200 may allow the projector 300 to project two independent one-hand-support virtual input layouts as a keyboard layout to be projected.

In the case where the number of the detected hands is greater than or equal to three, in operation 829, the processor 200 may allow the projector 300 to project a plurality of virtual input layouts as a keyboard layout to be projected. For example, the processor 200 may determine to project three one-hand-support virtual input layouts or both one one-hand-support virtual input layout and one two-hand-support virtual input layout.

Figure 9A:
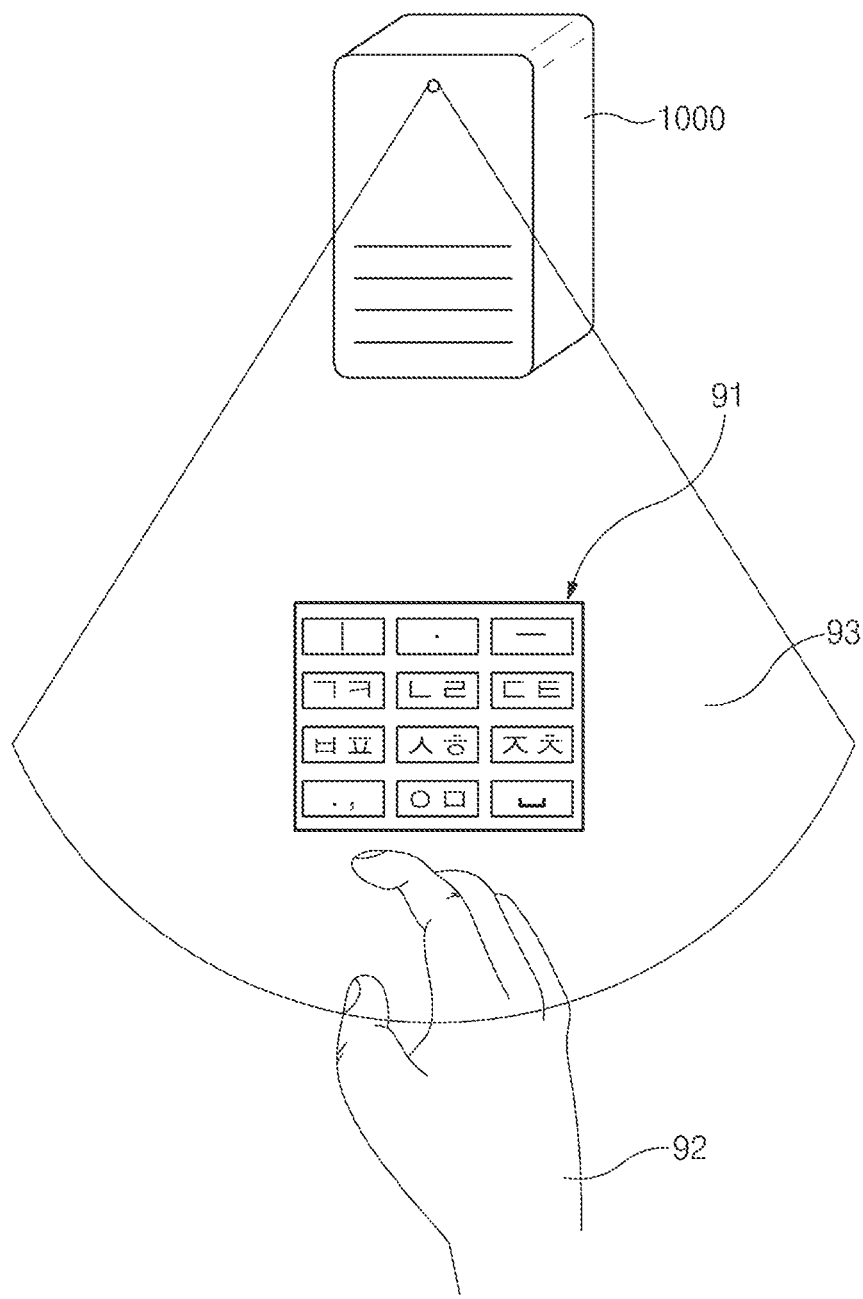
FIGS. 9A to 9C are diagrams illustrating a user input receiving method according to an embodiment of the present disclosure, which is performed through a one-hand-support virtual input layout is used.
Figure 9B:
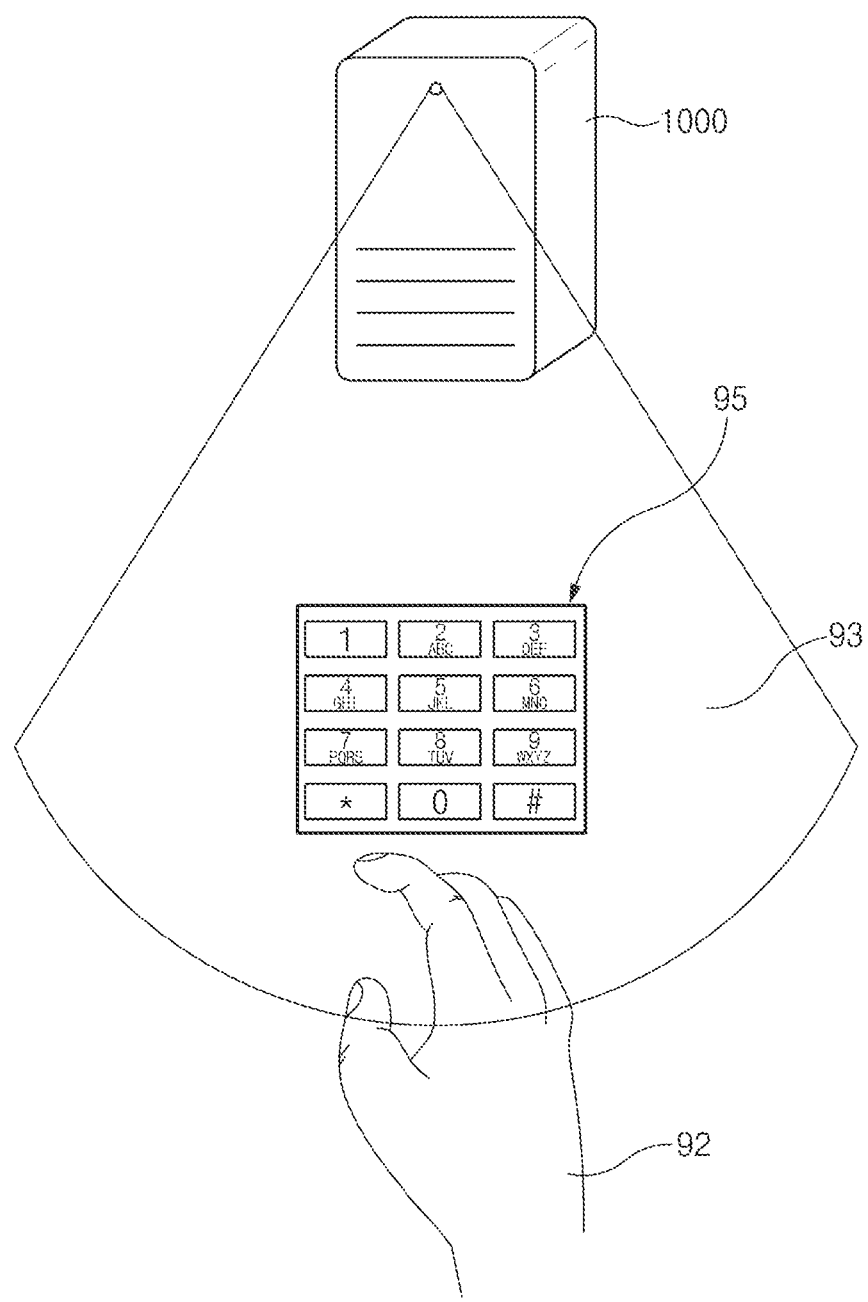
Figure 9C:
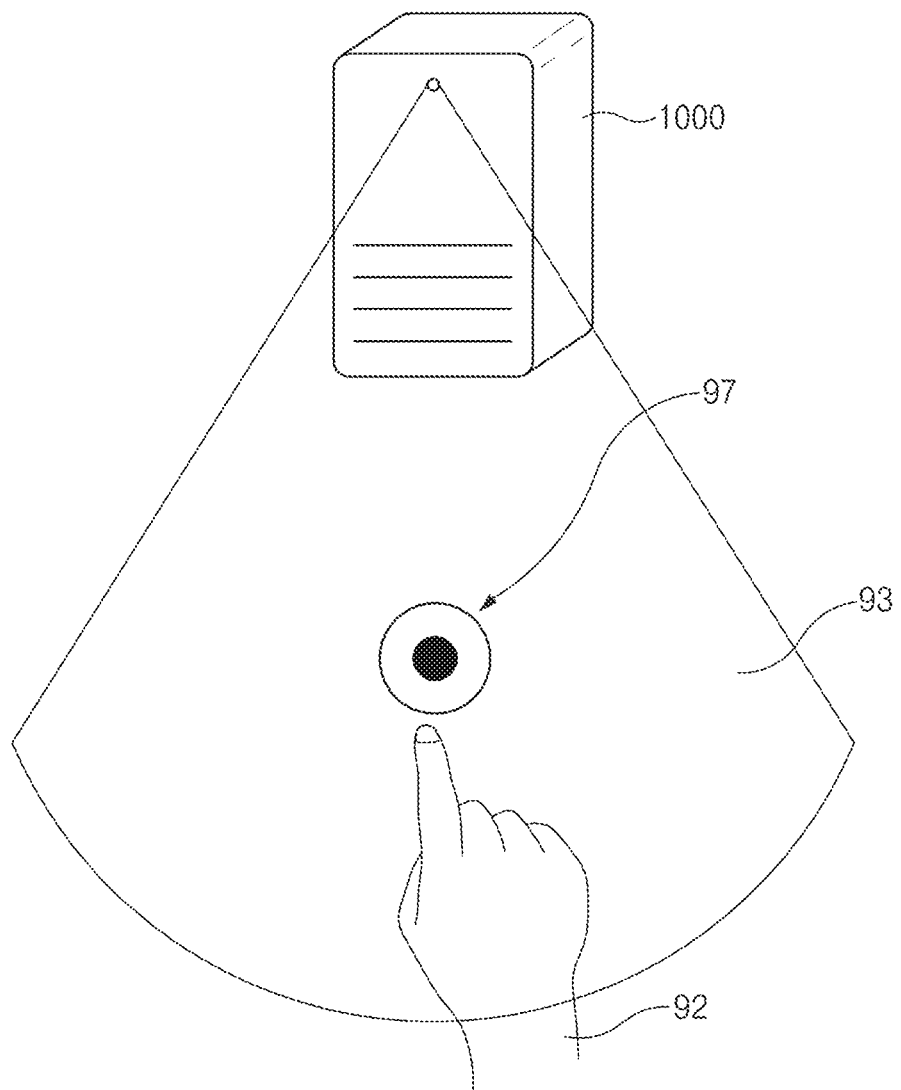

FIGS. 9A to 9C are diagrams illustrating a user input receiving method according to an embodiment of the present disclosure, which is performed through a one-hand-support virtual input layout is used. For example, FIGS. 9A to 9C illustrate examples in which the one-hand-support virtual input layout determined in operation 823 of FIG. 8 is projected on a user input plane.

FIG. 9A shows a Chunjiin key pad layout 91 as a one-hand-support virtual input layout which is determined by the processor 200. If the first sensor 110 may detect a user's one hand 92, the processor 200 may determine to project the Chunjiin key pad layout 91 as a one-hand-support virtual input layout. The projector 300 of the virtual input device 1000 may project the Chunjiin key pad layout 91 on a user input plane 93. The second sensor 120 may detect (or receive) a user input (a Korean alphabet input) through the Chunjiin key pad layout 91 projected on the user input plane 93.

FIG. 9B shows a 10-key layout with alphabet arranged 95 (hereinafter, referred to as "a 10-key layout") as a one-hand-support virtual input layout which is determined by the processor 200. If the first sensor 110 may detect the user's one hand 92, the processor 200 may determine to project the 10-key layout 95 as a one-hand-support virtual input layout. Likewise, the projector 300 of the virtual input device 1000 may project the 10-key layout 95 on the user input plane 93. The second sensor 120 may detect (or receive) a user input (alphabet or numeral input) through the 10-key layout 95 projected on the user input plane 93.

FIG. 9C shows a tracking point layout 97 as a one-hand-support virtual input layout which is determined by the processor 200. If the first sensor 110 may detect the user's one hand 92, the processor 200 may determine to project the tracking point layout 97 as a one-hand-support virtual input layout. Likewise, the projector 300 of the virtual input device 1000 may project the tracking point layout 97 on the user input plane 93. The second sensor 120 may detect (or receive) a user input (a direction or selection input (click)) through the tracking point layout 97 projected on the user input plane 93.

Figure 10:
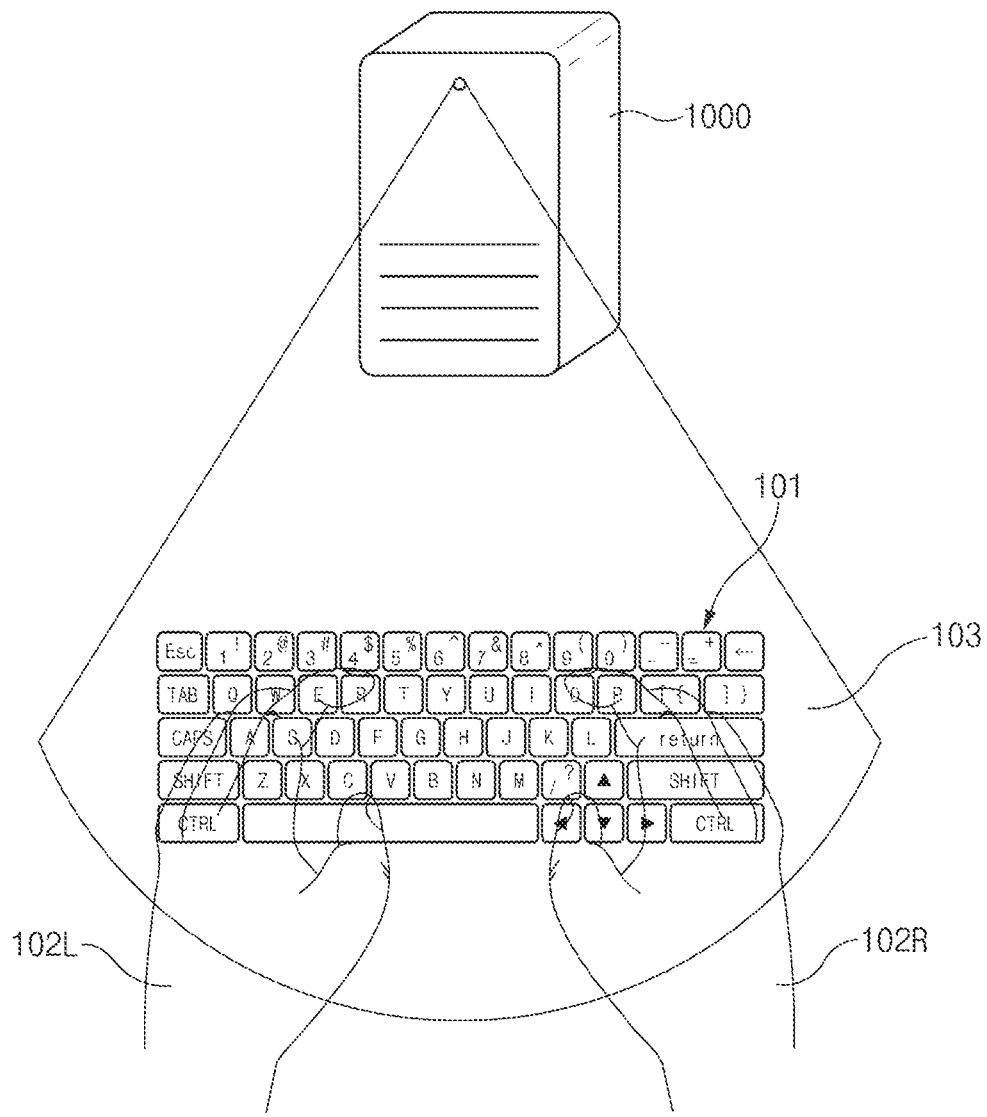
FIG. 10 is a diagram illustrating a user input receiving method according to an embodiment of the present disclosure, which is performed through a keyboard layout is used.

FIG. 10 is a diagram illustrating a user input receiving method according to an embodiment of the present disclosure, which is performed through a keyboard layout is used. For example, FIG. 10 illustrates an example in which a general keyboard layout determined in operation 817 of FIG. 8 is projected on a user input plane.

Referring to FIG. 10, the first sensor 110 may detect user's two hands 102L and 102R which are a left hand and a right hand of the same user, respectively, and may detect that a spacing between the left hand 102L and the right hand 102R is less than a specific spacing. The processor 200 may determine to project a general keyboard layout 101 as a virtual input layout to be projected. The projector 300 of the virtual input device 1000 may project the keyboard layout 101 on a user input plane 103. The second sensor 120 may receive a user input (an alphabet input) through the keyboard layout 101 projected on the user input plane 103.

Figure 11:
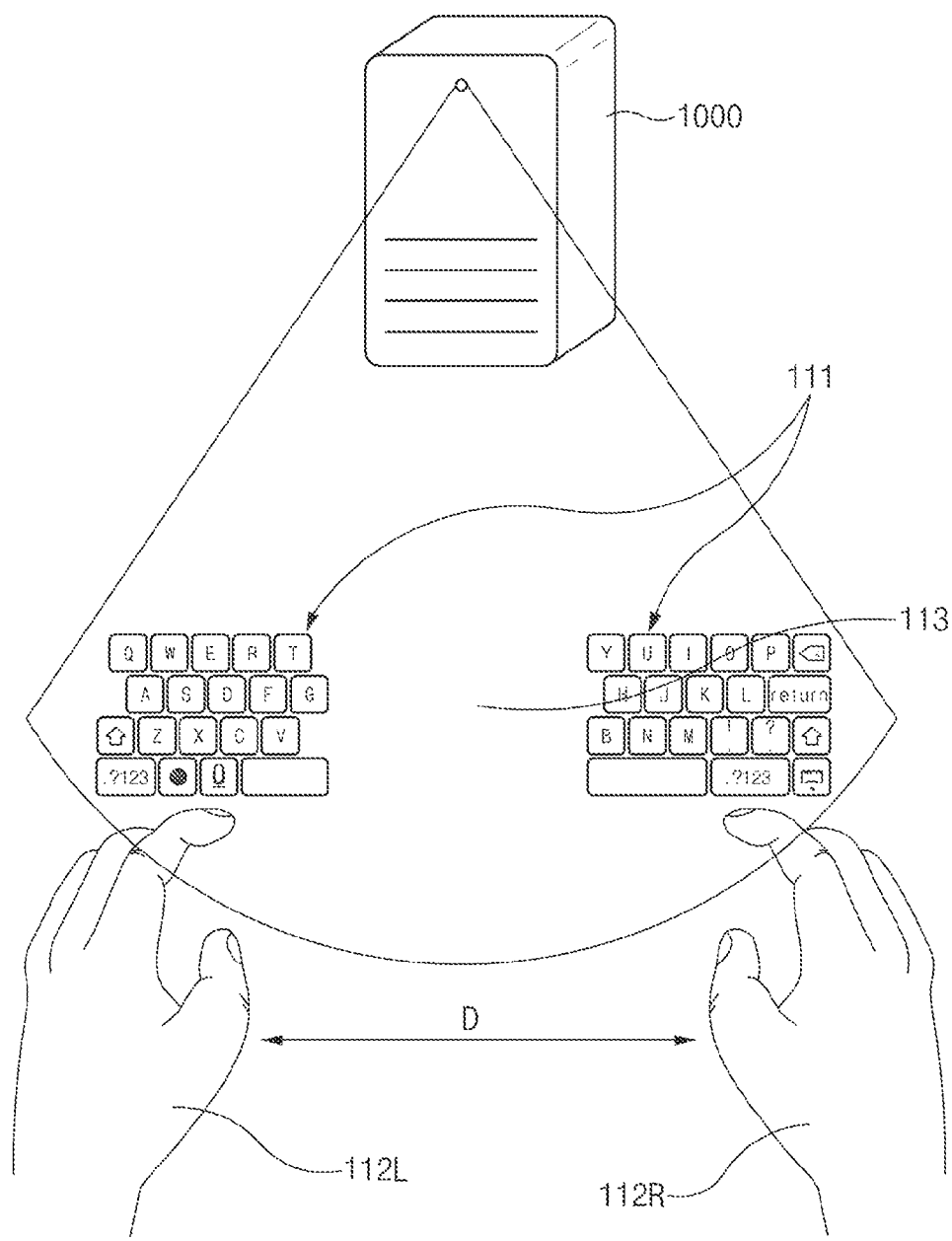
FIG. 11 is a diagram illustrating a user input receiving method according to an embodiment of the present disclosure, which is performed through a split keyboard layout is used.

FIG. 11 is a diagram illustrating a user input receiving method according to an embodiment of the present disclosure, which is performed through a split keyboard layout is used. For example, FIG. 11 illustrates an example in which a split keyboard layout determined in operation 825 of FIG. 8 is projected on a user input plane.

Referring to FIG. 11, the first sensor 110 may detect user's two hands 112L and 112R which are a left hand and a right hand of the same user, respectively, and may detect that a spacing between the left hand 112L and the right hand 112R is greater than a specific spacing. The processor 200 may determine to project a split keyboard layout 111 as a virtual input layout to be projected. The projector 300 of the virtual input device 1000 may project the split keyboard layout 111 on a user input plane 113. The second sensor 120 may receive a user input (an alphabet input) through the split keyboard layout 111 projected on the user input plane 113.

Figure 12A:
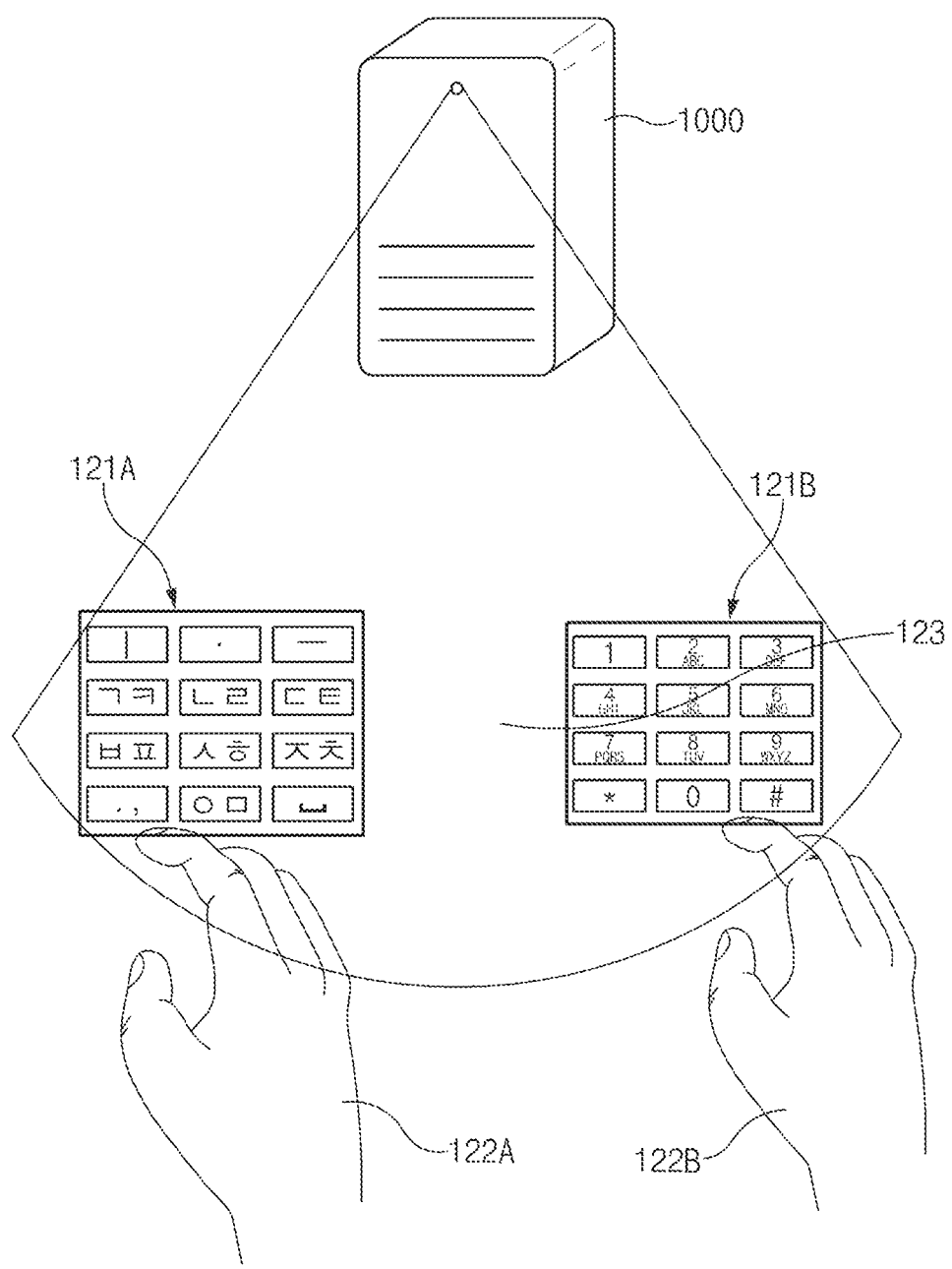
FIGS. 12A and 12B are diagrams illustrating a user input receiving method according to an embodiment of the present disclosure, which is performed through a virtual input layout for two people is used.
Figure 12B:
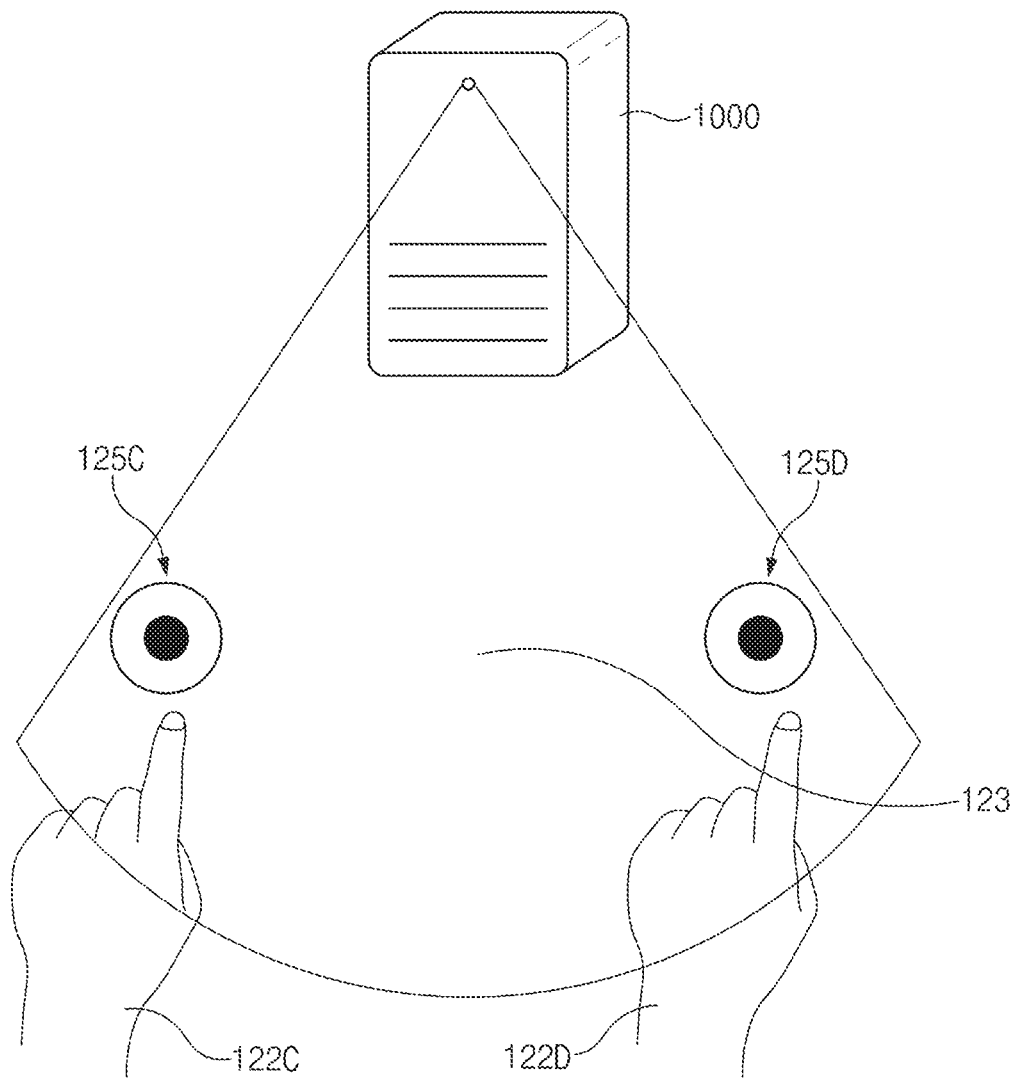

FIGS. 12A and 12B are diagrams illustrating a user input receiving method according to an embodiment of the present disclosure, which is performed through a virtual input layout for two people is used. For example, FIGS. 12A and 12B illustrates examples in which two one-hand-support virtual input layouts determined in operation 827 of FIG. 8 are projected on a user input plane.

Referring to FIG. 12A, the first sensor 110 may detect two hands, that is, a hand 122A of a user A and a hand 122B of a user B, and may detect that both hands 122A and 122B are right hands. The processor 200 may determine to project two one-hand-support virtual input layouts as a virtual input layout to be projected.

FIG. 12A shows both a Chunjiin key pad layout 121A and a 10-key layout 121B as two one-hand-support virtual input layouts. The projector 300 of the virtual input device 1000 may project the two one-hand-support virtual input layouts 121A and 121B on a user input plane 123. The second sensor 120 may receive user inputs from users A and B through two one-hand-support virtual input layouts 121A and 121B projected on the user input plane 123.

Furthermore, referring to FIG. 12B, since the first sensor 110 detects two hands, that is, a hand 122C of a user C and a hand 122D of a user D, and detects that both hands 122C and 122D are left hands, the processor 200 may determine to project two one-hand-support virtual input layouts as a virtual input layout to be projected.

FIG. 12B shows two tracking point layouts 125C and 125D as two one-hand-support virtual input layouts. The projector 300 of the virtual input device 1000 may project the two tracking point layouts 125C and 125D on the user input plane 123, and the second sensor 120 may receive user inputs from users C and D through the two tracking point layouts 125C and 125D projected on the user input plane 123.

Figure 13:
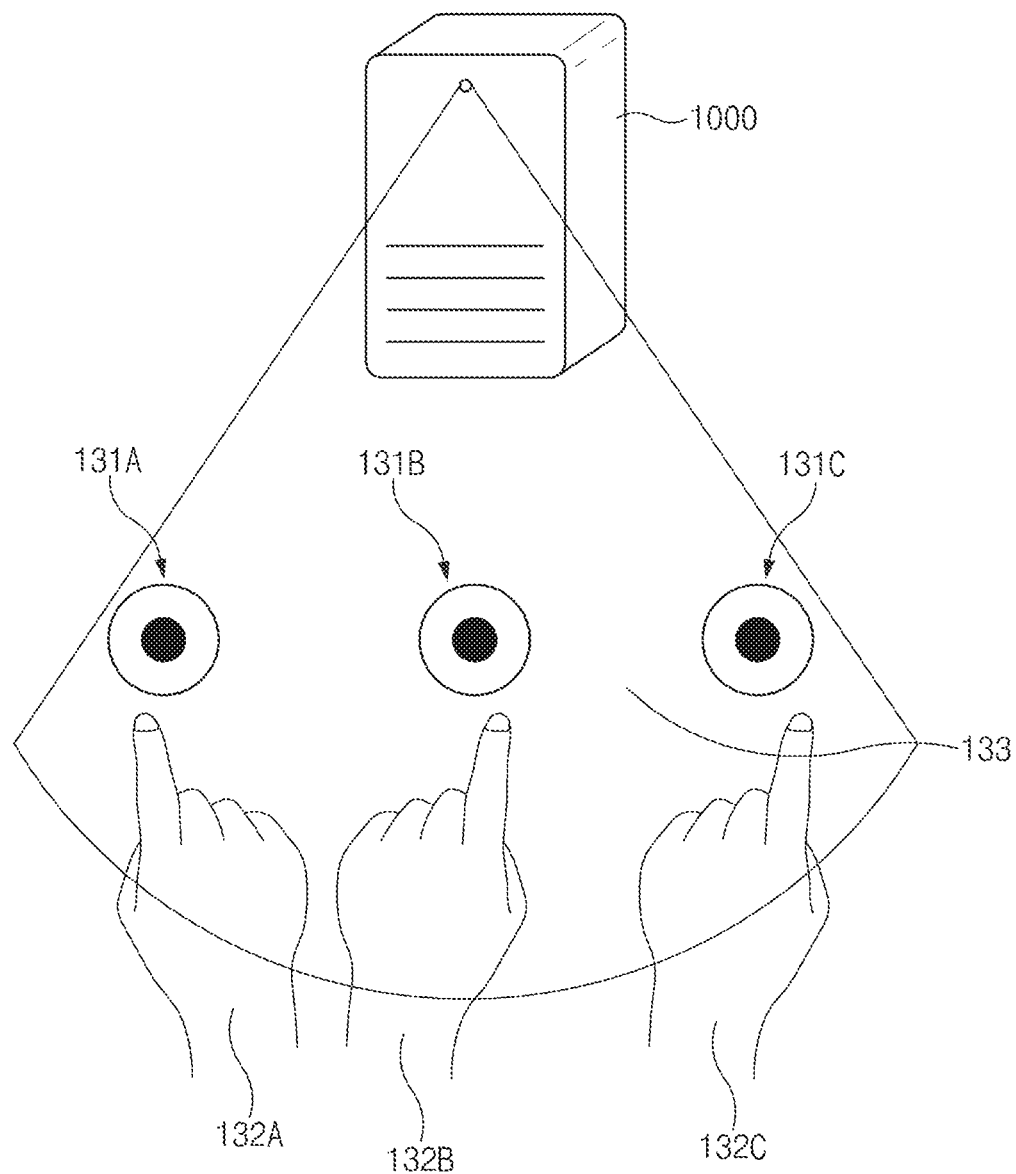
FIG. 13 is a diagram illustrating a user input receiving method according to an embodiment of the present disclosure, which is performed through a keyboard layout for multi users is used.

FIG. 13 is a diagram illustrating a user input receiving method according to an embodiment of the present disclosure, which is performed through a keyboard layout for multi-user is used. FIG. 13 illustrates an example in which three one-hand-support virtual input layouts determined in operation 829 of FIG. 8 are projected on a user input plane.

Referring to FIG. 13, since the first sensor 110 detects three hands, for example, a hand 132A of a user A, a hand 132B of a user B, and a hand 132C of a user C, the processor 200 may determine to project a plurality of virtual input layouts.

For example, FIG. 13 shows three tracking point layouts 131A, 131B and 131C as three one-hand-support virtual input layouts. The projector 300 of the virtual input device 1000 may project the three tracking point layouts 131A, 131B, and 131C on a user input plane 133. The second sensor 120 may respectively receive user inputs from users A, B, and C through the three tracking point layouts 131A, 131B, and 131C projected on the user input plane 133.

The embodiments in FIGS. 12A, 12B, and 13 may be suitable in the case where the virtual input device 1000 supports a plurality of operating systems. For example, the embodiments may support that multiple users enter characters at the same time under a plurality of operating systems. Furthermore, the embodiments may support a plurality of virtual input layouts (e.g., a plurality of tracking point layouts or a plurality of joy-pad layouts), thereby coping with a game in which multiple players are supported.

Figure 14:
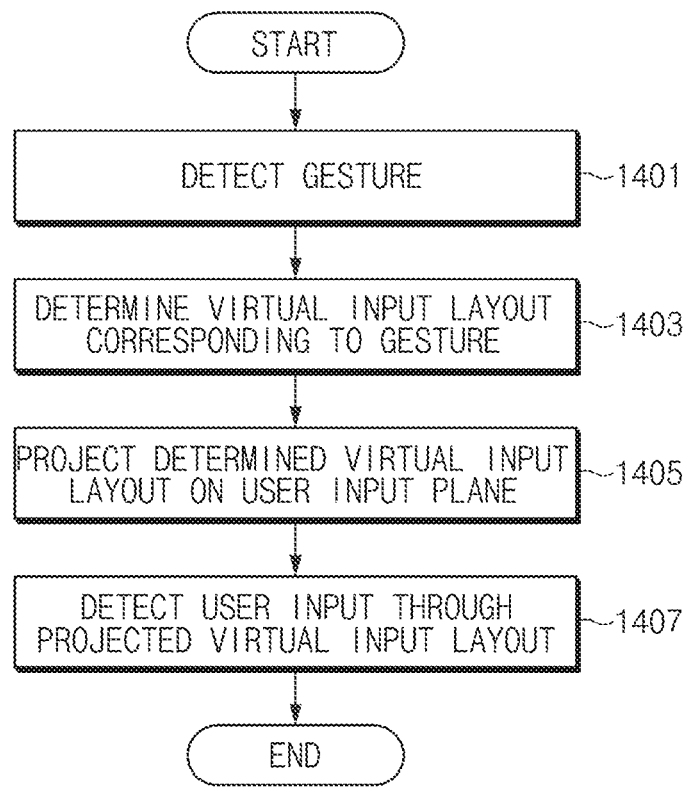
FIG. 14 is a flowchart illustrating a user input receiving method based on a gesture of a user hand according to an embodiment of the present disclosure.

FIG. 14 is a flowchart illustrating a user input receiving method based on a gesture of a user hand according to an embodiment of the present disclosure.

Referring to FIG. 14, a user input receiving method based on a gesture of a user hand, according to an embodiment of the present disclosure, may include operations 1401 to 1407. Operations 1405 and 1407 correspond to operations 305 and 307 of FIG. 3, and a detailed description thereof is thus omitted.

In operation 1401, the first sensor 110 may detect a gesture by a user hand. At least one of an image sensor (e.g., a camera), a stereo camera, an infrared camera, or an ultrasonic sensor may be used to detect a user gesture.

The gesture detected by the first sensor 110 may have various types of gestures, such as a gesture to clench first from the state of unfolded hand, a gesture to move an unfolded hand to left or right, a gesture to move a hand to left or right in a state where any finger of a hand is unfolded and fingers other than the unfolded finger are folded, and the like. Information about the gestures may correspond to each of specific virtual input layouts, and the corresponding result may be stored in the memory 400.

In operation 1403, the processor 200 may compare the gesture detected in operation 1401 with a specific gesture stored in the memory 400. If the detected gesture corresponds to the specific gesture stored in the memory 400, the processor 200 may determine to project a virtual input layout corresponding to the specific gesture.

Furthermore, according to various embodiments of the present disclosure, the memory 400 may store in advance a gesture which is used to change virtual input layouts in sequence. If the first sensor 110 detects the gesture specified in advance, the processor 200 may determine to change and project various virtual input layouts in sequence.

Figure 15A:
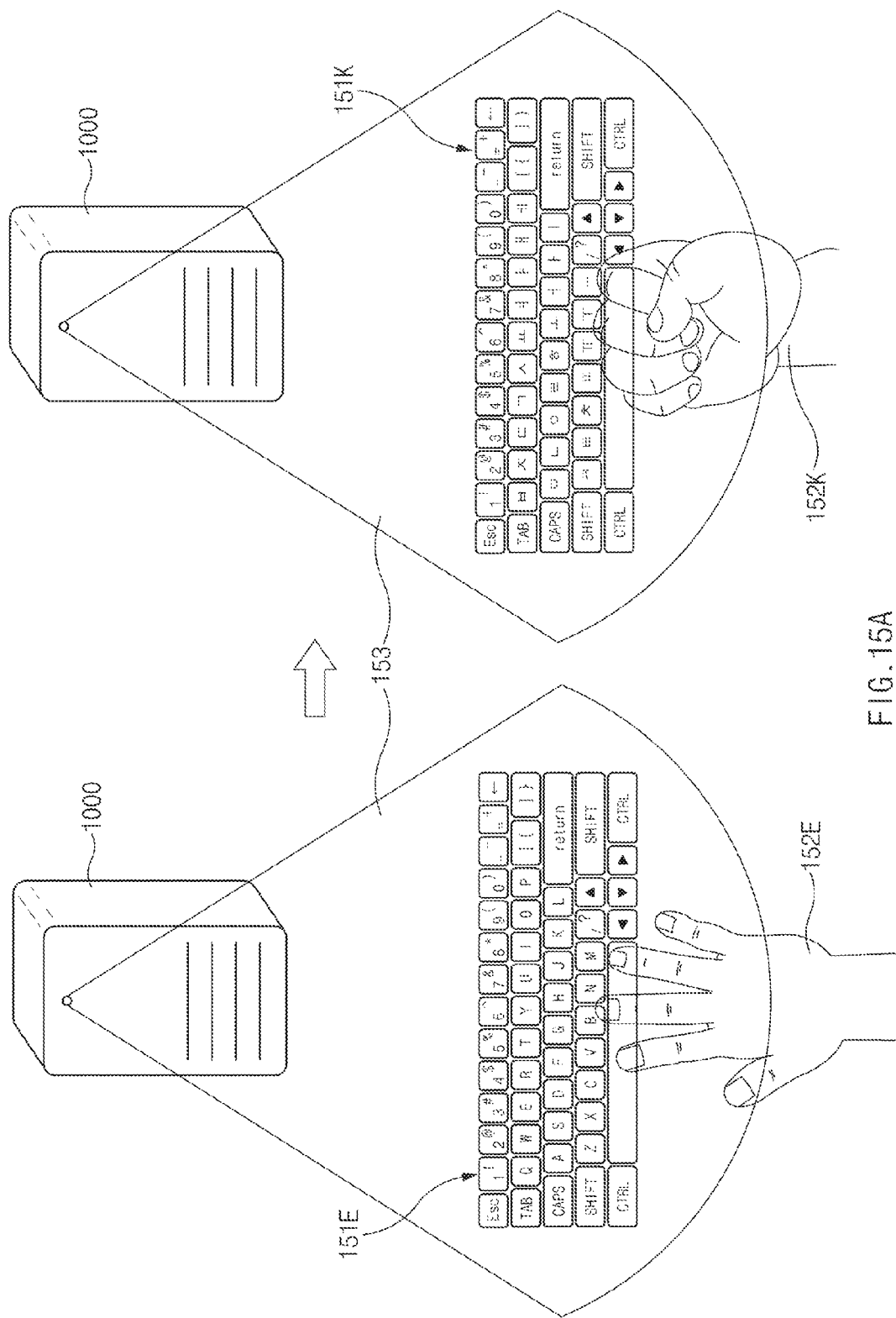
FIGS. 15A and 15B are diagrams illustrating a user input receiving method according to an embodiment of the present disclosure, which is performed based on a gesture is used.
Figure 15B:
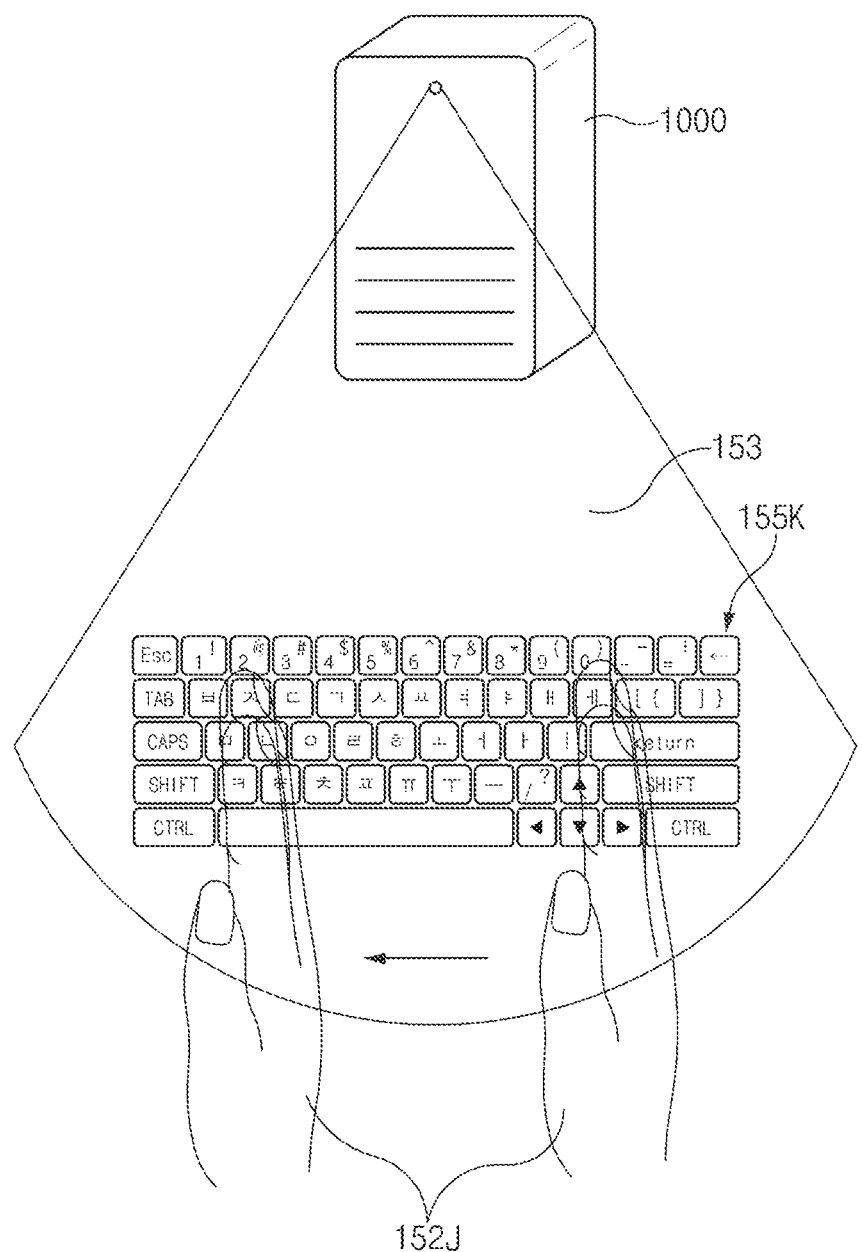

FIGS. 15A and 15B are diagrams illustrating a user input receiving method according to an embodiment of the present disclosure, which is performed based on a gesture is used.

Referring to FIG. 15A, the first sensor 110 may detect a gesture while a QWERTY keyboard 151E is projected from the virtual input device 1000, in which the user hand is changed from the unfolded state 152E to the clenched state 152K. If the gesture which is mapped to a Hangul 2-set keyboard 151K is stored in the memory 400, the processor 200 may determine to project from the virtual input device 1000 the Hangul 2-set keyboard 151K, which is mapped to the gesture changed from the unfolded state 152E of a hand to the clenched state 152K of a fist, on a user input plane 153. Therefore, the user may very conveniently change a keyboard layout to a virtual input layout which the user wants.

Furthermore, referring to FIG. 15B, the first sensor 110 may detect a gesture 152J in which a user hand moves to left or right in a state where all fingers of the user hand are unfolded. For example, the gesture 152J may be a gesture which changes virtual input layouts stored in the memory 400 in sequence. If the gesture 152J is detected by the first sensor 110, the processor 200 may sequentially change the current virtual input layout projected from the virtual input device 1000 on a user input plane 153 to another virtual input layout 155K stored in the memory 400. As a result, a user may conveniently change a keyboard layout to the virtual input layout which the user wants even if the user does not know the correspondence between the gesture stored in the memory 400 and the virtual input layout.

Generally a smartphone, a tablet PC, or the like may receive a user input through a soft key displayed on a smartphone, a tablet PC, or the like or may receive a user input through a physical keyboard connected. However, in the case where the soft key or the physical keyboard is used, the characteristics (e.g., a size of a hand) of a user body may fully not be considered. Furthermore, in the case where an input layout is changed to another one, it may be a need to separately operate user settings, thereby making it difficult for all users to perform the changing operation easily.

In contrast, the virtual input device 1000 according to various embodiments of the present disclosure may provide a virtual input layout which is most suitable to a user, based on characteristics of the user body (e.g., a hand), a location of the body, a movement (gesture) of the body, and the like. Furthermore, the virtual input device 1000 may automatically detect the characteristics of the user body, the location of the body, and the like and may provide a virtual input layout corresponding to the detection result. Accordingly, there may be no need to separately operate user settings.

In addition, if the virtual input device 1000 according to various embodiments of the present disclosure is mounted on a portable electronic device, such as a smartphone, the portability may remarkably be improved since it is not necessary to carry other hardware other than the electronic device. Furthermore, the risk of theft of an input device which is mounted on or connected with a public electronic device, such as a desktop PC, placed in a public place may be dispelled.

The virtual input device 1000 according to various embodiments of the present disclosure may provide the virtual input layout which is the most suitable to a user, based on the user gesture. Therefore, a foreigner who does not have a good command of foreign languages except a mother tongue may intuitively change a keyboard layout to a virtual input layout corresponding to his/her mother tongue such that the virtual input layout which he/she wants is provided.

At least a portion of a device (e.g., components of a virtual input device) or a method (e.g., operations) according to various embodiments of the present disclosure may be, for example, implemented by instructions stored in a non-transitory computer-readable storage media in the form of a program module. The instruction, when executed by a processor (e.g., a processor 200), may cause the processor to perform a function corresponding to the instruction. The non-transitory computer-readable storage media, for example, may be the memory 400.

The non-transitory computer-readable recording medium may include a hard disk, a magnetic media, a floppy disk, a magnetic media (e.g., a magnetic tape), an optical media (e.g., a compact disc read only memory (CD-ROM) and a DVD, a magneto-optical media (e.g., a floptical disk), and hardware devices (e.g., a ROM, a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation of the present disclosure, and vice versa.

A module or a program module according to various embodiments of the present disclosure may include at least one of the above elements, or a portion of the above elements may be omitted, or additional other elements may be further included. Operations performed by a module, a program module, or other elements according to various embodiments of the present disclosure may be executed sequentially, in parallel, repeatedly, or in a heuristic method. Also, a portion of operations may be executed in different sequences, omitted, or other operations may be added.

The virtual input device and a method for receiving a user input according to various embodiments of the present disclosure may intuitively provide a virtual input layout which is most suitable to a user, in consideration of a characteristics of a user hand (including the number of hands), a movement (gesture) of a user hand, and the like.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A virtual input device comprising:
    a first sensor configured to detect whether each of a plurality of hands is either a right hand or a left hand;
    a processor configured to determine a virtual input layout based on the plurality of hands;
    a projector configured to optically project the determined virtual input layout on a user input plane; and
    a second sensor configured to detect a user input through the projected virtual input layout,
    wherein, when the plurality of hands comprise either two right hands or two left hands, the processor is further configured to determine to project a plurality of one-hand-support virtual input layouts as a two-hand-support virtual input layout, and
    wherein, when the plurality of hands comprise both a right hand and a left hand, the processor is further configured to determine to project a keyboard layout as the two-hand-support virtual input layout.

2. The virtual input device of claim 1, wherein each of the plurality of one-hand-support virtual input layouts comprises one of a key pad layout, a joy-pad layout, and a tracking point layout.

3. The virtual input device of claim 2,
wherein the key pad layout comprises a key pad layout based on 3-by-4 keys, and
wherein the key pad layout based on 3-by-4 keys comprises one of a Chunjiin input layout, a Naratgul input layout, a Sky Hangul input layout, and a 10-key layout with alphabet arranged.

4. The virtual input device of claim 1,
wherein the first sensor further detects a spacing between the right hand and the left hand, and
wherein when the spacing is greater than a specific spacing, the processor determines to project a split keyboard layout as the keyboard layout.

5. The virtual input device of claim 1, wherein the keyboard layout comprises one of QWERTY keyboard, DVORAK keyboard, COLEMAK keyboard, QWERTZ keyboard, AZERTY keyboard, Hangul 2-set keyboard, Hangul 3-set keyboard, and Japanese industrial standard (JIS) keyboard.

6. The virtual input device of claim 1, wherein the first sensor and the second sensor are integrated.

7. The virtual input device of claim 1,
wherein the first sensor detects a size of each of the plurality of hands or a size of a finger of each of the plurality of hands, and
wherein the processor determines an area of a key included in the virtual input layout or a spacing between keys included therein, based on the detected size.

8. The virtual input device of claim 1,
wherein the first sensor detects a location of the plurality of hands, and
wherein the processor determines to project the virtual input layout on a location corresponding to the detected location.

9. The virtual input device of claim 1,
wherein the first sensor detects a gesture by each of the plurality of hands, and
wherein when the first sensor detects a specific gesture, the processor determines to project a virtual input layout corresponding to the specific gesture.

10. The virtual input device of claim 9, further comprising:
a memory configured to store a correspondence between the specific gesture and a virtual input layout corresponding to the specific gesture.

11. The virtual input device of claim 1, wherein the projector further projects content comprising the detected user input.

12. A method for receiving a user input, the method comprising:
detecting whether each of a plurality of hands is either a right hand or a left hand;
determining a virtual input layout based on the plurality of hands;
optically projecting the determined virtual input layout on a user input plane; and
detecting a user input through the projected virtual input layout,
wherein the determining of the virtual input layout comprises:
when the plurality of hands comprise either two right hands or two left hands, determining to project a plurality of one-hand-support virtual input layouts as a two-hand-support virtual input layout, and
when the plurality of hands comprise both a right hand and a left hand, determining to project a keyboard layout as the two-hand-support virtual input layout.

13. The method of claim 12, further comprising:
detecting a spacing between the right hand and the left hand; and
determining to project a split keyboard layout as the keyboard layout when the spacing is greater than a specific spacing.

14. The method of claim 12, further comprising:
detecting a size of each of the plurality of hands or a size of a finger of each of the plurality of hands; and
determining an area of a key included in the virtual input layout or a spacing between keys included therein, based on the detected size.

15. The method of claim 12, further comprising:
detecting a location of each of the plurality of hands; and
determining to project the virtual input layout on a location corresponding to the detected location.

16. The method of claim 12, further comprising:
detecting a gesture by each of the plurality of hands, and
determining to project a virtual input layout corresponding to a specific gesture when the specific gesture is detected.

* * * * *